United States Patent
Pan et al.

(10) Patent No.: US 10,818,926 B2
(45) Date of Patent: Oct. 27, 2020

(54) METHOD OF PRODUCING ELECTROCHEMICALLY STABLE ELASTOMER-ENCAPSULATED PARTICLES OF ANODE ACTIVE MATERIALS FOR LITHIUM BATTERIES

(71) Applicant: Nanotek Instruments, Inc., Dayton, OH (US)

(72) Inventors: Baofei Pan, Dayton, OH (US); Hui He, Dayton, OH (US); Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 0 days.

(21) Appl. No.: 15/914,216

(22) Filed: Mar. 7, 2018

(65) Prior Publication Data

US 2019/0280301 A1    Sep. 12, 2019

(51) Int. Cl.
*H01M 4/62* (2006.01)
*H01M 4/1397* (2010.01)
(Continued)

(52) U.S. Cl.
CPC .......... *H01M 4/622* (2013.01); *H01M 4/136* (2013.01); *H01M 4/1397* (2013.01); *H01M 4/58* (2013.01);
(Continued)

(58) Field of Classification Search
CPC .... H01M 4/622; H01M 4/136; H01M 4/1397; H01M 4/58; H01M 10/0525; H01M 2004/027
(Continued)

(56) References Cited

U.S. PATENT DOCUMENTS 2,798,878 A    7/1957  Hummers
3,836,511 A    9/1974  O'farrell et al.
(Continued)

FOREIGN PATENT DOCUMENTS

CN    103258990 A    8/2013
CN    105322132 A    2/2016
(Continued)

OTHER PUBLICATIONS

An et al., "Diameter-Selected Synthesis of Single Crystalline Trigonal Selenium Nanowires" Materials Chemistry and Physics (2007) vol. 101, No. 2-3, pp. 357-361.
(Continued)

*Primary Examiner* — Brian K Talbot

(57) ABSTRACT

A method of producing a powder mass for a lithium battery, comprising: (a) mixing an inorganic filler and an elastomer or its precursor in a liquid medium or solvent to form a suspension; (b) dispersing a plurality of particles of an anode active material in the suspension to form a slurry; and (c) dispensing the slurry and removing the solvent and/or polymerizing or curing the precursor to form the powder mass, wherein at least a particulate is composed of one or a plurality of anode particles being encapsulated by a layer of inorganic filler-reinforced elastomer having a thickness from 1 nm to 10 μm, a fully recoverable tensile strain from 2% to 500%, and a lithium ion conductivity from $10^{-7}$ S/cm to $5 \times 10^{-2}$ S/cm and the inorganic filler has a lithium intercalation potential from 1.1 V to 4.5 V versus Li/Li⁺.

29 Claims, 7 Drawing Sheets

(51) Int. Cl.
*H01M 4/58* (2010.01)
*H01M 10/0525* (2010.01)
*H01M 4/136* (2010.01)
*H01M 4/02* (2006.01)

(52) U.S. Cl.
CPC .. *H01M 10/0525* (2013.01); *H01M 2004/027* (2013.01)

(58) Field of Classification Search
USPC .......................................................... 427/115
See application file for complete search history.

(56) References Cited

U.S. PATENT DOCUMENTS

| | | |
|---|---|---|
| 4,720,910 A | 1/1988 | Rourke et al. |
| 5,057,339 A | 10/1991 | Ogawa |
| 5,270,417 A | 12/1993 | Soga et al. |
| 5,342,710 A | 8/1994 | Koksbang |
| 5,350,647 A | 9/1994 | Hope et al. |
| 5,409,785 A | 4/1995 | Nakano et al. |
| 5,424,151 A | 6/1995 | Koksbang et al. |
| 5,434,021 A | 7/1995 | Fauteux et al. |
| 5,460,905 A | 10/1995 | Skotheim |
| 5,536,599 A | 7/1996 | Alamgir et al. |
| 5,648,187 A | 7/1997 | Skotheim |
| 5,961,672 A | 10/1999 | Skotheim et al. |
| 6,025,094 A | 2/2000 | Visco et al. |
| 6,447,952 B1 | 9/2002 | Spiegel et al. |
| 6,451,484 B1 | 9/2002 | Han et al. |
| 6,475,678 B1 | 11/2002 | Suzuki |
| 6,515,101 B1 | 2/2003 | Sheares |
| 6,620,547 B1 | 9/2003 | Sung et al. |
| 6,733,924 B1 | 5/2004 | Skotheim et al. |
| 6,797,428 B1 | 9/2004 | Skotheim et al. |
| 6,936,381 B2 | 8/2005 | Skotheim et al. |
| 7,247,408 B2 | 7/2007 | Skotheim et al. |
| 7,282,295 B2 | 10/2007 | Visco et al. |
| 7,282,296 B2 | 10/2007 | Visco et al. |
| 7,282,302 B2 | 10/2007 | Visco et al. |
| 7,618,678 B2 | 11/2009 | Mao et al. |
| 8,597,828 B2 * | 12/2013 | Martinet ............... H01M 4/485 429/207 |
| 9,905,856 B1 | 2/2018 | Zhamu et al. |
| 10,084,182 B2 | 9/2018 | Pan et al. |
| 10,483,533 B2 | 11/2019 | Zhamu et al. |
| 2002/0182488 A1 | 12/2002 | Cho et al. |
| 2002/0195591 A1 | 12/2002 | Ravet et al. |
| 2003/0180619 A1 | 9/2003 | Tamura et al. |
| 2004/0018430 A1 * | 1/2004 | Holman ................. H01M 4/13 429/233 |
| 2005/0034993 A1 | 2/2005 | Gozdz et al. |
| 2005/0098914 A1 | 5/2005 | Varma et al. |
| 2005/0118508 A1 | 6/2005 | Yong et al. |
| 2005/0136330 A1 | 6/2005 | Mao et al. |
| 2007/0218369 A1 | 9/2007 | Kaiduka et al. |
| 2007/0289879 A1 | 12/2007 | Horton |
| 2008/0248393 A1 | 10/2008 | Richard et al. |
| 2008/0318128 A1 | 12/2008 | Simoneau et al. |
| 2009/0155676 A1 | 6/2009 | Zhamu et al. |
| 2009/0169725 A1 | 7/2009 | Zhamu et al. |
| 2010/0099029 A1 | 4/2010 | Kinoshita et al. |
| 2010/0112454 A1 | 5/2010 | Visco et al. |
| 2010/0143798 A1 | 6/2010 | Zhamu et al. |
| 2010/0173198 A1 * | 7/2010 | Zhamu .................. H01M 4/134 429/222 |
| 2011/0059361 A1 | 3/2011 | Wilkening et al. |
| 2011/0104571 A1 | 5/2011 | Zhamu et al. |
| 2011/0143211 A1 | 6/2011 | Takeyama |
| 2011/0177388 A1 | 7/2011 | Bae et al. |
| 2011/0244337 A1 | 10/2011 | Ohta et al. |
| 2011/0262816 A1 | 10/2011 | Amatucci |
| 2012/0064409 A1 | 3/2012 | Zhamu et al. |
| 2012/0070708 A1 | 3/2012 | Ohira et al. |
| 2012/0088154 A1 | 4/2012 | Liu et al. |
| 2013/0052544 A1 | 2/2013 | Ohkubo et al. |
| 2013/0054061 A1 | 2/2013 | Nishimoto |
| 2013/0157141 A1 | 6/2013 | Zhong et al. |
| 2013/0164615 A1 | 6/2013 | Manthiram et al. |
| 2013/0171339 A1 | 7/2013 | Wang et al. |
| 2013/0224603 A1 | 8/2013 | Chen et al. |
| 2013/0292613 A1 | 11/2013 | Wegner et al. |
| 2014/0072879 A1 | 3/2014 | Chen et al. |
| 2014/0147738 A1 | 5/2014 | Chen et al. |
| 2014/0147751 A1 | 5/2014 | Yang et al. |
| 2014/0154572 A1 | 6/2014 | Singh et al. |
| 2014/0162121 A1 | 6/2014 | Ryu et al. |
| 2014/0178747 A1 | 6/2014 | Tsai et al. |
| 2014/0234702 A1 | 8/2014 | Zhang et al. |
| 2014/0235513 A1 | 8/2014 | Kverel et al. |
| 2014/0363746 A1 | 12/2014 | He et al. |
| 2015/0044556 A1 | 2/2015 | Wang et al. |
| 2015/0064568 A1 | 3/2015 | Yushin et al. |
| 2015/0064574 A1 | 3/2015 | He et al. |
| 2015/0079485 A1 | 3/2015 | Choi et al. |
| 2015/0180000 A1 | 6/2015 | Roumi |
| 2015/0180037 A1 | 6/2015 | Gronwald et al. |
| 2015/0218323 A1 | 8/2015 | Kim et al. |
| 2015/0221935 A1 | 8/2015 | Zhou et al. |
| 2015/0236372 A1 | 8/2015 | Yushin et al. |
| 2015/0244025 A1 * | 8/2015 | Rhee ...................... C08L 71/02 429/307 |
| 2015/0318532 A1 | 11/2015 | Manthiram et al. |
| 2015/0325844 A1 | 11/2015 | Inoue |
| 2015/0372294 A1 | 12/2015 | Minami et al. |
| 2016/0013481 A1 | 1/2016 | Jeong et al. |
| 2016/0043384 A1 | 2/2016 | Zhamu et al. |
| 2016/0087266 A1 | 3/2016 | Muldoon et al. |
| 2016/0126543 A1 * | 5/2016 | Ota ...................... H01M 4/049 429/231.95 |
| 2016/0149216 A1 | 5/2016 | Mizuno et al. |
| 2016/0181611 A1 | 6/2016 | Cho et al. |
| 2016/0218341 A1 | 7/2016 | Kumar et al. |
| 2016/0240896 A1 | 8/2016 | Zhang et al. |
| 2016/0301075 A1 | 10/2016 | Zhamu et al. |
| 2016/0344035 A1 | 11/2016 | Zhamu et al. |
| 2016/0351877 A1 | 12/2016 | Kusachi et al. |
| 2016/0351909 A1 | 12/2016 | Bittner et al. |
| 2016/0372743 A1 | 12/2016 | Cho et al. |
| 2016/0372784 A1 | 12/2016 | Rayner et al. |
| 2017/0002154 A1 | 1/2017 | Hiasa et al. |
| 2017/0018799 A1 | 1/2017 | Jeong |
| 2017/0033357 A1 | 2/2017 | Cho et al. |
| 2017/0047584 A1 | 2/2017 | Hwang et al. |
| 2017/0062830 A1 | 3/2017 | Bao et al. |
| 2017/0092986 A1 | 3/2017 | Ogawa et al. |
| 2017/0098824 A1 | 4/2017 | Fasching et al. |
| 2017/0098856 A1 | 4/2017 | Zhamu et al. |
| 2017/0104204 A1 | 4/2017 | Zhamu et al. |
| 2017/0117535 A1 | 4/2017 | Yoon et al. |
| 2017/0117538 A1 | 4/2017 | Bendimerad et al. |
| 2017/0117589 A1 | 4/2017 | Tajima et al. |
| 2017/0141387 A1 | 5/2017 | Hayner et al. |
| 2017/0141399 A1 | 5/2017 | Lux et al. |
| 2017/0166722 A1 | 6/2017 | Zhamu et al. |
| 2017/0179468 A1 | 6/2017 | Fanous et al. |
| 2017/0194640 A1 | 7/2017 | Bucur et al. |
| 2017/0194648 A1 | 7/2017 | Bucur et al. |
| 2017/0200943 A1 | 7/2017 | Kawakami |
| 2017/0207484 A1 | 7/2017 | Zhamu et al. |
| 2017/0288211 A1 | 10/2017 | Zhamu et al. |
| 2017/0294643 A1 | 10/2017 | Burshtain et al. |
| 2017/0309917 A1 | 10/2017 | Lee et al. |
| 2017/0338472 A1 | 11/2017 | Zhamu et al. |
| 2017/0338474 A1 | 11/2017 | Lee et al. |
| 2017/0338490 A1 | 11/2017 | Xiao et al. |
| 2018/0053978 A1 | 2/2018 | Song et al. |
| 2018/0083265 A1 | 3/2018 | Singh et al. |
| 2018/0233736 A1 | 8/2018 | Zhamu et al. |
| 2018/0241031 A1 | 8/2018 | Pan et al. |
| 2018/0241032 A1 | 8/2018 | Pan et al. |
| 2018/0248173 A1 | 8/2018 | Pan et al. |
| 2018/0277913 A1 | 9/2018 | Pan et al. |
| 2018/0287142 A1 | 10/2018 | Zhamu et al. |

(56) References Cited

U.S. PATENT DOCUMENTS

| | | | |
|---|---|---|---|
| 2018/0294475 | A1 | 10/2018 | Zhamu et al. |
| 2018/0294476 | A1 | 10/2018 | Zhamu et al. |
| 2018/0301707 | A1 | 10/2018 | Pan et al. |
| 2019/0051905 | A1 | 2/2019 | Zhamu et al. |
| 2019/0058185 | A1 | 2/2019 | Lee et al. |
| 2019/0077669 | A1 | 3/2019 | Zhamu et al. |
| 2019/0088958 | A1 | 3/2019 | Viner et al. |
| 2019/0260028 | A1 | 8/2019 | Zhamu et al. |
| 2019/0319303 | A1 | 10/2019 | Kushida et al. |
| 2019/0386332 | A1 | 12/2019 | Zhamu et al. |
| 2019/0393466 | A1 | 12/2019 | Lin et al. |
| 2019/0393495 | A1 | 12/2019 | He et al. |
| 2019/0393510 | A1 | 12/2019 | He et al. |
| 2019/0393543 | A1 | 12/2019 | Zhamu et al. |

FOREIGN PATENT DOCUMENTS

| | | | |
|---|---|---|---|
| CN | 108899472 | A | 11/2018 |
| EP | 2787563 | A1 | 10/2014 |
| JP | 1275613 | A | 11/1989 |
| JP | 2010160984 | A | 7/2010 |
| JP | 2011524611 | A | 9/2011 |
| JP | 2015084320 | A | 4/2015 |
| JP | 2015176656 | A | 10/2015 |
| KR | 1020030050475 | A | 6/2003 |
| KR | 100670527 | B1 | 1/2007 |
| KR | 1020100138607 | A | 12/2010 |
| KR | 1020140101640 | A | 8/2014 |
| KR | 20160052351 | A | 5/2016 |
| KR | 1020160085386 | A | 7/2016 |
| KR | 1020160087511 | A | 7/2016 |
| KR | 1020170001069 | U | 3/2017 |
| KR | 1020170086003 | A | 7/2017 |
| KR | 1020170126404 | A | 11/2017 |
| KR | 1020180035752 | A | 4/2018 |
| WO | 2007108424 | A1 | 9/2007 |
| WO | 2015141799 | A1 | 9/2015 |
| WO | 2016015915 | A1 | 2/2016 |
| WO | 2017172104 | A1 | 10/2017 |
| WO | 2017200798 | A1 | 11/2017 |
| WO | 2018075538 | A1 | 4/2018 |
| WO | 2018148090 | A1 | 8/2018 |

OTHER PUBLICATIONS

An et al., "Large-Scale Synthesis of High Quality Trigonal Selenium Nanowires" European Journal of Inorganic Chemistry (2003) vol. 17, pp. 3250-3255.

Arai et al., "Versatile supramolecular cross-linker: a rotaxane cross-linker that directly endows vinyl polymers with movable cross-links" Chemistry (2013) vol. 19, pp. 5917-5923.

Chen et al., "Selenium nanowires and nanotubes synthesized via a facile template-free solution method" Materials Research Bulletin (2010) vol. 45, pp. 699-704.

Dwivedi et al., "An Organic Acid-induced Synthesis and Characterization of Selenium Nanoparticles" Journal of Nanotechnology (2011) Article ID 651971, 6 pages.

Fan et al., "Hollow selenium encapsulated into 3D graphene hydrogels for lithium-selenium batteries with high rate performance and cycling stability" RSC Adv. (2017) vol. 7, pp. 21281-21286.

Gao et al., "Hollow Sphere Selenium Nanoparticles: Their In-Vitro Anti Hydroxyl Radical Effect" Advanced Materials (2002), vol. 14, No. 4, pp. 290-293.

Ji et al., "A highly ordered nanostructured carbon-sulphur cathode for lithium-sulphur batteries" Nature Materials (2009) vol. 8, pp. 500-506.

Li et al., "Mixed Surfactant Template Method for Preparation of Nanometer Selenium" E-Journal of Chemistry (2009) vol. 6, No. S1, pp. S304-S310.

Lin et al., "Observation in the Growth of Selenium Nanoparticles" Journal of Chinese Chemical Society (2004) vol. 51, No. 2, pp. 239-242.

Luesakul et al., "Shape-controlled synthesis of cubic-like selenium nanoparticles via the self-assembly method" Carbohydrate Polymers (2016) vol. 153, pp. 435-444.

PCT/US17/18452 International Search Report and Written Opinion dated Apr. 25, 2017, 9 pages.

PCT/US18/16404 International Search Report and Written Opinion dated Apr. 13, 2018, 11 pages.

PCT/US18/16410 International Search Report and Written Opinion dated Apr. 20, 2018, 10 pages.

PCT/US18/16418 International Search Report and Written Opinion dated Apr. 25, 2018, 9 pages.

PCT/US18/16423 International Search Report and Written Opinion dated Apr. 24, 2018, 9 pages.

PCT/US18/16426 International Search Report and Written Opinion dated Apr. 24, 2018, 9 pages.

PCT/US18/16431 International Search Report and Written Opinion dated Apr. 26, 2018, 6 pages.

PCT/US18/20892 International Search Report and Written Opinion dated May 2, 2018, 6 pages.

Xie et al., "A Novel Method for Synthesis of Sulfonated SBS Ionomers by Ring-Opening Reaction of Epoxidized SBS, Their Characterization, Properties, and Blends" Journal of Elastomers and Plastics (2007) vol. 39, pp. 317-334.

Zeng et al., "Solvothermal synthesis of trigonal selenium with butterfly-like microstructure" Particuology (2013) vol. 11, No. 5, pp. 614-617.

Zhang et al., "Synthesis of selenium nanoparticles in the presence of polysaccharides" Materials Letters (2004) vol. 58, No. 21, pp. 2590-2594.

Buonerba et al., "Novel Synthetic Strategy for the Sulfonation of Polybutadiene and Styrene-Butadiene Copolymers" Macromolecules (2013) vol. 46, pp. 778-784.

Elabd et al., "Sulfonation and Characterization of Poly(styrene-isobutylene-styrene) Triblock Copolymers at High Ion-Exchange Capacities" Polymer (2004) vol. 45, pp. 3037-3043.

Karlicky et al., "Halogenated Graphenes: Rapidly Growing Family of Graphene Derivatives" ACS Nano (2013) vol. 7, No. 8, pp. 6434-6464.

Choi et al., "Highly elastic binders integrating polyrotaxanes for silicon microparticle anodes in lithium ion batteries" Science (2017) vol. 357, No. 6348, pp. 279-283.

Habib et al., "Elastomeric Nanocomposite Based on Exfoliated Graphene Oxide and Its Characteristics without Vulcanization" Hindawi Journal of Nanomaterials (2017) vol. 2017, Article ID 8543137, 11 pages.

KR-10-2015-0044333 English language translation.

Liu et al., "Solutions for the problems of silicon-carbon anode materials for lithium-ion batteries" Royal Society Open Science (2018) vol. 5, p. 172370.

PCT/US18/25135 International Search Report and Written Opinion dated Jun. 27, 2018, 14 pages.

PCT/US18/25150 International Search Report and Written Opinion dated Jun. 29, 2018, 14 pages.

PCT/US18/25160 International Search Report and Written Opinion dated Nov. 21, 2018, 12 pages.

PCT/US18/25163 International Search Report and Written Opinion dated Jul. 27, 2018, 19 pages.

PCT/US18/43421 International Search Report and Written Opinion dated Oct. 11, 2018, 13 pages.

PCT/US18/43435 International Search Report and Written Opinion dated Jan. 7, 2019, 14 pages.

PCT/US19/18931 International Search Report and Written Opinion dated May 8, 2019, 13 pages.

PCT/US19/19061 International Search Report and Written Opinion dated May 13, 2019, 11 pages.

PCT/US19/19062 International Search Report and Written Opinion dated May 13, 2019, 9 pages.

PCT/US19/20214 International Search Report and Written Opinion dated May 2, 2019, 7 pages.

PCT/US19/20222 International Search Report and Written Opinion dated May 3, 2019, 7 pages.

PCT/US19/21137 International Search Report and Written Opinion dated Jun. 18, 2019, 13 pages.

(56) References Cited

OTHER PUBLICATIONS

U.S. Appl. No. 14/999,080 Nonfinal Office Action dated Nov. 9, 2018.
U.S. Appl. No. 15/442,803 Nonfinal Office Action dated Dec. 28, 2018, 24 pages.
U.S. Appl. No. 15/442,807 Nonfinal Office Action dated Dec. 14, 2018, 7 pages.
U.S. Appl. No. 15/483,342 Final Office Action dated Mar. 22, 2019, 52 pages.
U.S. Appl. No. 15/483,342 Nonfinal Office Action dated Nov. 2, 2018, 37 pages.
U.S. Appl. No. 15/483,347 Final Office Action dated Apr. 16, 2019, 23 pages.
U.S. Appl. No. 15/483,347 Nonfinal Office Action dated Nov. 2, 2018, 20 pages.
U.S. Appl. No. 15/483,348 Final Office Action dated Apr. 9, 2019, 28 pages.
U.S. Appl. No. 15/483,348 Nonfinal Office Action dated Nov. 21, 2018, 22 pages.
U.S. Appl. No. 15/901,367 Nonfinal Office Action dated Jun. 10, 2019, 12 pages.
Vaikhanski et al., "Fiber-reinforced composite foam from expandable PVC microspheres" Composites Part A (2003) vol. 34, pp. 1245-1253.
Wikipedia contributors. "Anode." Wikipedia, The Free Encyclopedia, Mar. 4, 2019, Web. Mar. 18, 2019. (Year: 2019).
Wikipedia contributors. "Molar mass distribution." Wikipedia, The Free Encyclopedia, Feb. 1, 2019, Web. Mar. 18, 2019. (Year: 2019).
U.S. Appl. No. 16/113,676 Nonfinal Office Action dated Oct. 4, 2019, 9 pages.
U.S. Appl. No. 16/113,676 Final Office Action dated Apr. 9, 2020, 15 pages.
U.S. Appl. No. 16/116,329 Nonfinal Office Action dated Mar. 30, 2020, 6 pages.
U.S. Appl. No. 16/116,341 Nonfinal Office Action dated Mar. 30, 2020, 6 pages.
U.S. Appl. No. 16/120,875 Final Office Action dated Apr. 9, 2020, 14 pages.
U.S. Appl. No. 16/120,875 Nonfinal Office Action dated Oct. 4, 2019, 10 pages.
U.S. Appl. No. 16/123,218 Final Office Action dated Apr. 9, 2020, 13 pages.
U.S. Appl. No. 16/123,218 Nonfinal Office Action dated Oct. 4, 2019, 9 pages.
U.S. Appl. No. 16/126,736 Nonfinal Office Action dated Mar. 30, 2020, 6 pages.
U.S. Appl. No. 16/126,745 Nonfinal Office Action dated Mar. 30, 2020, 6 pages.
U.S. Appl. No. 16/160,257 Nonfinal Office Action dated Apr. 3, 2020, 16 pages.
U.S. Appl. No. 16/166,536 Nonfinal Office Action dated May 14, 2020, 5 pages.
U.S. Appl. No. 16/166,574 Final Office Action dated Apr. 9, 2020, 12 pages.
U.S. Appl. No. 16/166,574 Nonfinal Office Action dated Oct. 4, 2019, 9 pages.
U.S. Appl. No. 16/238,052 Nonfinal Office Action dated Apr. 3, 2020, 14 pages.
U.S. Appl. No. 16/256,346 Nonfinal Office Action dated May 19, 2020, 16 pages.
"Nylon" en.wikipedia.org/wiki/Nylon. Accessed Feb. 18, 2020 (Year: 2020) no month.
AZO Materials Table of Properties on Styrene Butadiene Rubber, 5 pages. no date.
PCT/US19/27147 International Search Report and Written Opinion dated Aug. 1, 2019, 16 pages.
PCT/US19/36748 International Search Report and Written Opinion dated Oct. 16, 2019, 11 pages.
PCT/US19/37690 International Search Report and Written Opinion dated Oct. 18, 2019, 18 pages.
PCT/US19/37692 International Search Report and Written Opinion dated Oct. 21, 2019, 18 pages.
PCT/US19/37700 International Search Report and Written Opinion dated Oct. 23, 2019, 17 pages.
PCT/US19/38367 International Search Report and Written Opinion dated Oct. 18, 2019, 17 pages.
PCT/US19/38368 International Search Report and Written Opinion dated Oct. 18, 2019, 18 pages.
PCT/US19/38436 International Search Report and Written Opinion dated Oct. 16, 2019, 17 pages.
PCT/US19/38455 International Search Report and Written Opinion dated Oct. 18, 2019, 10 pages.
PCT/US19/38456 International Search Report and Written Opinion dated Oct. 16, 2019, 16 pages.
PCT/US19/38881 International Search Report and Written Opinion dated Oct. 18, 2019, 14 pages.
PCT/US19/47642 International Search Report and Written Opinion dated Dec. 6, 2019, 16 pages.
PCT/US19/48084 International Search Report and Written Opinion dated Dec. 16, 2019, 9 pages.
PCT/US19/55758 International Search Report and Written Opinion dated Jan. 31, 2020, 15 pages.
PCT/US20/14869 International Search Report and Written Opinion dated May 19, 2020, 13 pages.
U.S. Appl. No. 14/999,080 Nonfinal Office Action dated Oct. 30, 2019, 15 pages.
U.S. Appl. No. 15/434,632 Final Office Action dated Dec. 26, 2019, 20 pages.
U.S. Appl. No. 15/442,278 Final Office Action dated Oct. 21, 2019, 16 pages.
U.S. Appl. No. 15/442,278 Nonfinal Office Action dated Feb. 28, 2020, 16 pages.
U.S. Appl. No. 15/442,803 Final Office Action dated Feb. 24, 2020, 36 pages.
U.S. Appl. No. 15/442,803 Nonfinal Office Action dated Jul. 25, 2019, 37 pages.
U.S. Appl. No. 15/478,125 Final Office Action dated Aug. 23, 2019, 14 pages.
U.S. Appl. No. 15/478,125 Nonfinal Office Action dated Mar. 5, 2020, 11 pages.
U.S. Appl. No. 15/483,347 Final Office Action dated Dec. 27, 2019, 22 pages.
U.S. Appl. No. 15/483,347 Nonfinal Office Action dated Sep. 17, 2019, 20 pages.
U.S. Appl. No. 15/483,348 Advisory Action dated Jul. 18, 2019, 9 pages.
U.S. Appl. No. 15/483,348 Final Office Action dated Jan. 20, 2020, 9 pages.
U.S. Appl. No. 15/483,348 Nonfinal Office Action dated Sep. 16, 2019, 22 pages.
U.S. Appl. No. 15/485,934 Nonfinal Office Action dated May 26, 2020, 12 pages.
U.S. Appl. No. 15/676,677 Nonfinal Office Action dated Feb. 5, 2020, 15 pages.
U.S. Appl. No. 15/676,680 Nonfinal Office Action dated May 20, 2020, 8 pages.
U.S. Appl. No. 15/903,788 Nonfinal Office Action dated Jun. 4, 2020, 11 pages.
U.S. Appl. No. 15/903,808 Final Office Action dated May 15, 2020, 9 pages.
U.S. Appl. No. 15/903,808 Nonfinal Office Action dated Jan. 28, 2020, 8 pages.
U.S. Appl. No. 15/910,465 Final Office Action dated May 15, 2020, 13 pages.
U.S. Appl. No. 15/910,465 Nonfinal Office Action dated Nov. 1, 2019, 12 pages.
U.S. Appl. No. 15/910,471 Nonfinal Office Action dated May 13, 2020, 11 pages.
U.S. Appl. No. 15/910,471 Non-final Office Action dated Nov. 8, 2019, 12 pages.
U.S. Appl. No. 15/954,088 Nonfinal Office Action dated Mar. 13, 2020, 9 pages.

(56) References Cited

OTHER PUBLICATIONS

U.S. Appl. No. 16/010,213 Nonfinal Office Action dated Mar. 27, 2020, 12 pages.
U.S. Appl. No. 16/010,225 Nonfinal Office Action dated Mar. 27, 2020, 13 pages.
U.S. Appl. No. 16/010,965 Nonfinal Office Action dated Jan. 8, 2020, 5 pages.
U.S. Appl. No. 16/010,975 Nonfinal Office Action dated Jan. 8, 2020, 5 pages.
U.S. Appl. No. 16/014,623 Final Office Action dated Apr. 9, 2020, 14 pages.
U.S. Appl. No. 16/014,623 Nonfinal Office Action dated Oct. 4, 2019, 8 pages.
U.S. Appl. No. 16/017,294 Nonfinal Office Action dated Jan. 23, 2020, 6 pages.
U.S. Appl. No. 16/112,208 Nonfinal Office Action dated Apr. 2, 2020, 7 pages.
U.S. Appl. No. 16/112,225 Nonfinal Office Action dated May 13, 2020, 9 pages.

\* cited by examiner

METHOD OF PRODUCING ELECTROCHEMICALLY STABLE ELASTOMER-ENCAPSULATED PARTICLES OF ANODE ACTIVE MATERIALS FOR LITHIUM BATTERIES

FIELD OF THE INVENTION

The present disclosure relates generally to the field of rechargeable lithium battery and, more particularly, to the anode active materials in the form of particulates containing transition metal-filled elastomer-encapsulated particles and the method of producing same.

BACKGROUND OF THE INVENTION

A unit cell or building block of a lithium-ion battery is typically composed of an anode current collector, an anode or negative electrode layer (containing an anode active material responsible for storing lithium therein, a conductive additive, and a resin binder), an electrolyte and porous separator, a cathode or positive electrode layer (containing a cathode active material responsible for storing lithium therein, a conductive additive, and a resin binder), and a separate cathode current collector. The electrolyte is in ionic contact with both the anode active material and the cathode active material. A porous separator is not required if the electrolyte is a solid-state electrolyte.

The binder in the binder layer is used to bond the anode active material (e.g. graphite or Si particles) and a conductive filler (e.g. carbon black or carbon nanotube) together to form an anode layer of structural integrity, and to bond the anode layer to a separate anode current collector, which acts to collect electrons from the anode active material when the battery is discharged. In other words, in the negative electrode (anode) side of the battery, there are typically four different materials involved: an anode active material, a conductive additive, a resin binder (e.g. polyvinylidine fluoride, PVDF, or styrene-butadiene rubber, SBR), and an anode current collector (typically a sheet of Cu foil). Typically the former three materials form a separate, discrete anode layer and the latter one forms another discrete layer.

The most commonly used anode active materials for lithium-ion batteries are natural graphite and synthetic graphite (or artificial graphite) that can be intercalated with lithium and the resulting graphite intercalation compound (GIC) may be expressed as $Li_xC_6$, where x is typically less than 1. The maximum amount of lithium that can be reversibly intercalated into the interstices between graphene planes of a perfect graphite crystal corresponds to x=1, defining a theoretical specific capacity of 372 mAh/g.

Graphite or carbon anodes can have a long cycle life due to the presence of a protective solid-electrolyte interface layer (SEI), which results from the reaction between lithium and the electrolyte (or between lithium and the anode surface/edge atoms or functional groups) during the first several charge-discharge cycles. The lithium in this reaction comes from some of the lithium ions originally intended for the charge transfer purpose. As the SEI is formed, the lithium ions become part of the inert SEI layer and become irreversible, i.e. these positive ions can no longer be shuttled back and forth between the anode and the cathode during charges/discharges. Therefore, it is desirable to use a minimum amount of lithium for the formation of an effective SEI layer. In addition to SEI formation, the irreversible capacity loss $Q_{ir}$ can also be attributed to graphite exfoliation caused by electrolyte/solvent co-intercalation and other side reactions.

In addition to carbon- or graphite-based anode materials, other inorganic materials that have been evaluated for potential anode applications include metal oxides, metal nitrides, metal sulfides, and the like, and a range of metals, metal alloys, and intermetallic compounds that can accommodate lithium atoms/ions or react with lithium. Among these materials, lithium alloys having a composition formula of $Li_aA$ (A is a metal or semiconductor element, such as Al and Si, and "a" satisfies 0<a≤5) are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{44}Pb$ (569 mAh/g), LiZn (410 mAh/g), and $Li_3Bi$ (385 mAh/g). However, as schematically illustrated in FIG. 2(A), in an anode composed of these high-capacity materials, severe pulverization (fragmentation of the alloy particles) occurs during the charge and discharge cycles due to severe expansion and contraction of the anode active material particles induced by the insertion and extraction of the lithium ions in and out of these particles. The expansion and contraction, and the resulting pulverization, of active material particles, lead to loss of contacts between active material particles and conductive additives and loss of contacts between the anode active material and its current collector. These adverse effects result in a significantly shortened charge-discharge cycle life.

To overcome the problems associated with such mechanical degradation, three technical approaches have been proposed:

(1) reducing the size of the active material particle, presumably for the purpose of reducing the total strain energy that can be stored in a particle, which is a driving force for crack formation in the particle. However, a reduced particle size implies a higher surface area available for potentially reacting with the liquid electrolyte to form a higher amount of SEI. Such a reaction is undesirable since it is a source of irreversible capacity loss.

(2) depositing the electrode active material in a thin film form directly onto a current collector, such as a copper foil. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total lithium storage capacity and low lithium storage capacity per unit electrode surface area (even though the capacity per unit mass can be large). Such a thin film must have a thickness less than 100 nm to be more resistant to cycling-induced cracking, further diminishing the total lithium storage capacity and the lithium storage capacity per unit electrode surface area. Such a thin-film battery has very limited scope of application. A desirable and typical electrode thickness is from 100 μm to 200 μm. These thin-film electrodes (with a thickness of <500 nm or even <100 nm) fall short of the required thickness by three (3) orders of magnitude, not just by a factor of 3.

(3) using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nanparticles. Presumably, the protective matrix provides a cushioning effect for particle expansion or shrinkage, and prevents the electrolyte from contacting and reacting with the electrode active material. Examples of high-capacity anode active particles are Si, Sn, and $SnO_2$. Unfortunately, when an active material particle, such as Si particle, expands (e.g. up to a volume expansion of 380%) during the battery charge step, the protective coating is easily broken due to the mechanical weakness and/o brittleness of the protective coating materials. There has been no high-strength and high-toughness material available that is itself also lithium ion conductive.

It may be further noted that the coating or matrix materials used to protect active particles (such as Si and Sn) are carbon, sol gel graphite, metal oxide, monomer, ceramic, and lithium oxide. These protective materials are all very brittle, weak (of low strength), and/or non-conducting (e.g., ceramic or oxide coating). Ideally, the protective material should meet the following requirements: (a) The coating or matrix material should be of high strength and stiffness so that it can help to refrain the electrode active material particles, when lithiated, from expanding to an excessive extent. (b) The protective material should also have high fracture toughness or high resistance to crack formation to avoid disintegration during repeated cycling. (c) The protective material must be inert (inactive) with respect to the electrolyte, but be a good lithium ion conductor. (d) The protective material must not provide any significant amount of defect sites that irreversibly trap lithium ions. (e) The protective material must be lithium ion-conducting as well as electron-conducting. The prior art protective materials all fall short of these requirements. Hence, it was not surprising to observe that the resulting anode typically shows a reversible specific capacity much lower than expected. In many cases, the first-cycle efficiency is extremely low (mostly lower than 80% and some even lower than 60%). Furthermore, in most cases, the electrode was not capable of operating for a large number of cycles. Additionally, most of these electrodes are not high-rate capable, exhibiting unacceptably low capacity at a high discharge rate.

Due to these and other reasons, most of prior art composite electrodes and electrode active materials have deficiencies in some ways, e.g., in most cases, less than satisfactory reversible capacity, poor cycling stability, high irreversible capacity, ineffectiveness in reducing the internal stress or strain during the lithium ion insertion and extraction steps, and other undesirable side effects.

Complex composite particles of particular interest are a mixture of separate Si and graphite particles dispersed in a carbon matrix; e.g. those prepared by Mao, et al. ["Carbon-coated Silicon Particle Powder as the Anode Material for Lithium Batteries and the Method of Making the Same," US 2005/0136330 (Jun. 23, 2005)]. Also of interest are carbon matrix-containing complex nano Si (protected by oxide) and graphite particles dispersed therein, and carbon-coated Si particles distributed on a surface of graphite particles Again, these complex composite particles led to a low specific capacity or for up to a small number of cycles only. It appears that carbon by itself is relatively weak and brittle and the presence of micron-sized graphite particles does not improve the mechanical integrity of carbon since graphite particles are themselves relatively weak. Graphite was used in these cases presumably for the purpose of improving the electrical conductivity of the anode material. Furthermore, polymeric carbon, amorphous carbon, or pre-graphitic carbon may have too many lithium-trapping sites that irreversibly capture lithium during the first few cycles, resulting in excessive irreversibility.

In summary, the prior art has not demonstrated a material that has all or most of the properties desired for use as an anode active material in a lithium-ion battery. Thus, there is an urgent and continuing need for a new anode active material that enables a lithium-ion battery to exhibit a high cycle life, high reversible capacity, low irreversible capacity, small particle sizes (for high-rate capacity), and compatibility with commonly used electrolytes. There is also a need for a method of readily or easily producing such a material in large quantities.

Thus, it is a specific object of the present disclosure to meet these needs and address the issues associated the rapid capacity decay of a lithium battery containing a high-capacity anode active material.

SUMMARY OF THE INVENTION

Herein reported is an anode active material layer or electrode (an anode electrode or negative electrode) for a lithium battery that contains a very unique class of anode active materials—particulates containing inorganic filler reinforced elastomer-encapsulated particles of an anode active material. This new class of material is capable of overcoming the rapid capacity decay problem commonly associated with a lithium-ion battery that features a high-capacity anode active material, such as Si, $SiO_x$ (0.1<x<1.9), Ge, Sn, $SnO_2$, $Mn_3O_4$, and $Co_3O_4$.

The anode electrode comprises multiple particulates of an anode active material, wherein at least a particulate is composed of one or a plurality of the anode active material particles that are encapsulated by a thin layer of inorganic filler-reinforced elastomer having from 0.01% to 50% by weight of an inorganic filler dispersed in an elastomeric matrix material (based on the total weight of the inorganic filler-reinforced elastomer), wherein the encapsulating thin layer of inorganic filler-reinforced elastomer has a thickness from 1 nm to 10 μm, a fully recoverable tensile strain from 2% to 500%, and a lithium ion conductivity from $10^{-7}$ S/cm to $5 \times 10^{-2}$ S/cm and wherein the inorganic filler has a lithium intercalation potential no less than 1.1 V versus Li/Li$^+$ (preferably from 1.1 V to 4.5 V, more preferably from 1.1 to 3.5 V, and most preferably from 1.1 to 2.5 V).

The inorganic filler is preferably selected from an oxide, carbide, boride, nitride, sulfide, phosphide, or selenide of a transition metal, a lithiated version thereof, or a combination thereof. Preferably, the transition metal is selected from Ti, V, Cr, Mn, Fe, Co, Ni, Cu, Zn, Y, Zr, Nb, Mo, Pd, Ag, Cd, La, Ta, W, Pt, Au, Hg, a combination thereof, or a combination thereof with Al, Ga, In, Sn, Pb, Sb, or Bi.

Preferably, particles of this inorganic filler are in a form of nanoparticle, nanowire, nanofiber, nanotube, nanosheet, nanoplatelet, nanodisc, nanobelt, nanoribbon, or nanohorn having a dimension (diameter, thickness, or width, etc.) less than 100 nm, preferably less than 10 nm.

The encapsulating thin layer of inorganic filler-reinforced elastomer has a fully recoverable tensile strain from 2% to 500% (more typically from 5% to 300% and most typically from 10% to 150%), a thickness from 1 nm to 10 μm, and a lithium ion conductivity from $10^{-7}$ S/cm to $5 \times 10^{-2}$ S/cm (more typically from $10^{-5}$ S/cm to $10^{-3}$ S/cm) when measured at room temperature on a cast thin film 20 μm thick. Preferably, this thin encapsulating layer also has an electrical conductivity from $10^{-7}$ S/cm to 100 S/cm (more typically from $10^{-3}$ S/cm to 10 S/cm when an electron-conducting additive is added into the elastomer matrix material). The anode active material preferably contains a high-capacity anode active material that has a specific capacity of lithium storage greater than 372 mAh/g, which is the theoretical capacity of graphite.

Preferably, the elastomeric matrix material contains a sulfonated or non-sulfonated version of an elastomer selected from natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poly(ethylene-co-octene) (POE) elastomer, poly(ethylene-co-butene) (PBE) elastomer, styrene-ethylene-butadiene-styrene (SEBS) elastomer,epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof. These sulfonated elastomers or rubbers, when present without graphene sheets, exhibit a high elasticity (having a fully recoverable tensile strain from 2% to 800%). In other words, they can be stretched up to 800% (8 times of the original length when under tension) and, upon release of the tensile stress, they can fully recover back to the original dimension. By adding from 0.01% to 50% by weight of graphene sheets dispersed in a sulfonated elastomeric matrix material, the fully recoverable tensile strains are typically reduced down to 2%-500% (more typically from 5% to 300% and most typically from 10% to 150%).

In certain preferred embodiments, the inorganic filler-reinforced elastomer further contains an electron-conducting filler dispersed in the elastomer matrix material wherein the electron-conducting filler is selected from a carbon nanotube, carbon nanofiber, carbon nanoparticle, metal nanoparticle, metal nanowire, electron-conducting polymer, graphene, and combinations thereof. The graphene may be preferably selected from pristine graphene, graphene oxide, reduced graphene oxide, graphene fluoride, graphene chloride, nitrogenated graphene, hydrogenated graphene, doped graphene, functionalized graphene, or a combination thereof and the graphene preferably comprises single-layer graphene or few-layer graphene, wherein the few-layer graphene is defined as a graphene platelet formed of less than 10 graphene planes. The electron-conducting polymer is preferably selected from (but not limited to) polyaniline, polypyrrole, polythiophene, polyfuran, a bi-cyclic polymer, a sulfonated derivative thereof, or a combination thereof.

Preferably, the graphene sheets have a lateral dimension (length or width) from 5 nm to 5 μm, more preferably from 10 nm to 1 μm, and most preferably from 10 nm to 300 nm. Shorter graphene sheets allow for easier encapsulation and enable faster lithium ion transport through the inorganic filler-reinforced elastomer-based encapsulating layer.

In this anode electrode, the anode active material is selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof; (g) particles of Li, Li alloy, or surface-stabilized Li having at least 60% by weight of lithium element therein; and (h) combinations thereof.

In some preferred embodiments, the anode active material contains a prelithiated Si, prelithiated Ge, prelithiated Sn, prelithiated $SnO_x$, prelithiated $SiO_x$, prelithiated iron oxide, prelithiated $VO_2$, prelithiated $Co_3O_4$, prelithiated $Ni_3O_4$, or a combination thereof, wherein x=1 to 2. It may be noted that prelithiation of an anode active material means that this material has been pre-intercalated by or doped with lithium ions up to a weight fraction from 0.1% to 54.7% of Li in the lithiated product.

The anode active material is preferably in a form of nanoparticle (spherical, ellipsoidal, and irregular shape), nanowire, nanofiber, nanotube, nanosheet, nanoplatelet, nanodisc, nanobelt, nanoribbon, or nanohorn having a thickness or diameter less than 100 nm. These shapes can be collectively referred to as "particles" unless otherwise specified or unless a specific type among the above species is desired. Further preferably, the anode active material has a dimension less than 50 nm, even more preferably less than 20 nm, and most preferably less than 10 nm.

In some embodiments, one particle or a cluster of multiple particles may be coated with or embraced by a layer of carbon disposed between the particle(s) and the sulfonated elastomer/graphene composite layer (the encapsulating shell). Alternatively or additionally, a carbon layer may be deposited to embrace the encapsulated particle or the encapsulated cluster of multiple anode active material particles.

The particulate may further contain a graphite or carbon material mixed with the active material particles, which are all encapsulated by the encapsulating shell (but not dispersed within this thin layer of inorganic filler-reinforced elastomer). The carbon or graphite material is selected from polymeric carbon, amorphous carbon, chemical vapor deposition carbon, coal tar pitch, petroleum pitch, mesophase pitch, carbon black, coke, acetylene black, activated carbon, fine expanded graphite particle with a dimension smaller than 100 nm, artificial graphite particle, natural graphite particle, or a combination thereof.

The anode active material particles may be coated with or embraced by a conductive protective coating, selected from a carbon material, electronically conductive polymer, conductive metal oxide, or conductive metal coating. Preferably, the anode active material, in the form of a nanoparticle, nanowire, nanofiber, nanotube, nanosheet, nanoplatelet, nanodisc, nanobelt, nanoribbon, or nanohorn is pre-intercalated or pre-doped with lithium ions to form a prelithiated anode active material having an amount of lithium from 0.1% to 54.7% by weight of said prelithiated anode active material.

Preferably and typically, the inorganic filler-reinforced elastomer has a lithium ion conductivity no less than $10^{-6}$ S/cm, more preferably no less than $5 \times 10^{-5}$ S/cm. In certain embodiments, the inorganic filler-reinforced elastomer further contains from 0.1% to 40% by weight (preferably from 1% to 30% by weight) of a lithium ion-conducting additive dispersed in the elastomer matrix material.

In some embodiments, the elastomeric matrix material contains a material selected from a sulfonated or non-sulfonated version of natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), metallocene-based poly(ethylene-co-octene) (POE) elastomer, poly(ethylene-co-butene) (PBE) elastomer, styrene-ethylene-butadiene-styrene (SEBS) elastomer, epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof. Sulfonation imparts higher lithium ion conductivity to the elastomer.

In some preferred embodiments, the inorganic filler-reinforced elastomer further contains a lithium ion-conducting additive dispersed in an elastomer matrix material, wherein the lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0 \leq x \leq 1$, $1 \leq y \leq 4$.

In some embodiments, the inorganic filler-reinforced elastomer further contains a lithium ion-conducting additive dispersed in a sulfonated elastomer matrix material, wherein the lithium ion-conducting additive contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-meta-sulfonate, ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphates, ($LiPF_3(CF_2CF_3)_3$), lithium bisperfluoro-ethysulfonylimide (LiBETI), lithium bis(trifluoromethanesulphonyl)imide, lithium bis(fluorosulphonyl) imide, lithium trifluoromethanesulfonimide (LiTF SI), ionic liquid-based lithium salts, and combinations thereof.

The proportion of this lithium ion-conducing additive is preferably from 0.1% to 40% by weight, but more preferably from 1% to 25% by weight. The sum of this additive and graphene sheets preferably occupies from 1% to 40% by weight, more preferably from 3% to 35% by weight, and most preferably from 5% to 25% by weight of the resulting composite weight (the elastomer matrix, electron-conducting additive, and lithium ion-conducting additive combined).

In certain preferred embodiments, the elastomeric matrix material may contain a mixture or blend of a sulfonated elastomer and an electron-conducting polymer selected from polyaniline, polypyrrole, polythiophene, polyfuran, a bi-cyclic polymer, derivatives thereof (e.g. sulfonated versions of these electron-conducting polymers), or a combination thereof. The proportion of this electron-conducting polymer is preferably from 0.1% to 20% by weight.

In some embodiments, the elastomeric matrix material contains a mixture or blend of a sulfonated elastomer and a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazene, polyvinyl chloride, polydimethylsiloxane, poly(vinylidene fluoride)-hexafluoropropylene (PVDF-HFP), a sulfonated derivative thereof, or a combination thereof. Sulfonation is herein found to impart improved lithium ion conductivity to a polymer. The proportion of this lithium ion-conducting polymer is preferably from 0.1% to 20% by weight. Mixing or dispersion of an additive or reinforcement species in an elastomer or rubber may be conducted using solution mixing or melt mixing.

The present disclosure also provides a powder mass of an anode active material for a lithium battery. The powder mass comprises multiple particulates of an anode active material, wherein at least one particulate is composed of one or a plurality of the anode active material particles that are encapsulated by a thin layer of inorganic filler-reinforced elastomer having from 0.01% to 50% by weight of an inorganic filler dispersed in an elastomeric matrix material (based on the total weight of the inorganic filler-reinforced elastomer), wherein the encapsulating thin layer of inorganic filler-reinforced elastomer has a thickness from 1 nm to 10 μm, a fully recoverable tensile strain from 2% to 500%, and a lithium ion conductivity from $10^{-7}$ S/cm to $5 \times 0^{-2}$ S/cm and wherein the inorganic filler has a lithium intercalation potential from 1.1 V to 4.5 V. The inorganic filler is preferably selected from an oxide, carbide, boride, nitride, sulfide, phosphide, or selenide of a transition metal, a lithiated version thereof, or a combination thereof. Preferably, the transition metal is selected from Ti, V, Cr, Mn, Fe, Co, Ni, Cu, Zn, Y, Zr, Nb, Mo, Pd, Ag, Cd, La, Ta, W, Pt, Au, Hg, a combination thereof, or a combination thereof with Al, Ga, In, Sn, Pb, Sb, or Bi. The particles of this inorganic filler are preferably in a form of nanoparticle, nanowire, nanofiber, nanotube, nanosheet, nanobelt, nanoribbon, nanodisc, nanoplatelet, or nanohorn having a dimension (diameter, thickness, or width, etc.) less than 100 nm, preferably less than 10 nm.

In certain embodiments, the inorganic filler is selected from nanodiscs, nanoplatelets, or nanosheets of (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, nickel, manganese, or any transition metal; (d) boron nitride, or (e) a combination thereof, wherein the nanodiscs, nanoplatelets, or nanosheets have a thickness from 1 nm to 100 nm.

The anode active material preferably is selected from a high-capacity anode active material having a specific capacity of lithium storage greater than 372 mAh/g.

The powder mass may further comprise, in addition to the inorganic filler-reinforced elastomer-encapsulated particulates, some graphite particles, carbon particles, mesophase microbeads, carbon or graphite fibers, carbon nanotubes, graphene sheets, or a combination thereof. These additional graphite/carbon materials serve as a conductive additive and, if so desired, as a diluent to reduce the overall specific capacity of an anode electrode (for the purpose of matching the cathode which typically has a lower specific capacity). Preferably, the high-capacity anode is prelithiated (pre-intercalated or pre-loaded with lithium before the anode material is incorporated into a battery).

The present disclosure also provides an anode electrode that contains the presently disclosed inorganic filler-reinforced elastomer-encapsulated high-capacity anode material particles, an optional conductive additive (e.g. expanded graphite flakes, carbon black, acetylene black, or carbon nanotube), an optional resin binder (typically required), and, optionally, some amount of the common anode active materials (e.g. particles of natural graphite, synthetic graphite, hard carbon, etc.).

The present disclosure also provides a lithium battery containing an optional anode current collector, the presently disclosed anode electrode as described above, a cathode active material layer or cathode electrode, an optional cathode current collector, an electrolyte in ionic contact with the anode active material layer and the cathode active material layer and an optional porous separator. The lithium battery may be a lithium-ion battery, lithium metal battery (containing lithium metal or lithium alloy as the main anode active material and containing no intercalation-based anode active material), lithium-sulfur battery, lithium-selenium battery, or lithium-air battery.

The disclosure also provides a method of producing a powder mass of an anode active material for a lithium battery, the method comprising: (a) mixing particles of an inorganic filler (optionally along with an electron-conducting filler and/or a lithium ion-conducting filler) and an elastomer or its precursor (e.g. monomer or oligomer) in a liquid medium or solvent to form a suspension; (b) dispersing a plurality of particles of an anode active material in the suspension to form a slurry; and (c) dispensing the slurry and removing the solvent and/or polymerizing/curing the precursor to form the powder mass, wherein the powder mass comprises multiple particulates of the anode active material, wherein at least one of the particulates is composed of one or a plurality of the anode active material particles which are encapsulated by a thin layer of inorganic filler-reinforced elastomer having from 0.01% to 50% by weight of particles of an inorganic filler dispersed in an elastomeric matrix material and the encapsulating thin layer of inorganic filler-reinforced elastomer has a thickness from 1 nm to 10 μm (preferably from 1 nm to 100 nm), a fully recoverable tensile strain from 2% to 500%, and a lithium ion conductivity from $10^{-7}$ S/cm to $10^{-2}$ S/cm. Preferably, this encapsulating layer material also has an electrical conductivity from $10^{-7}$ S/cm to 100 S/cm when measured at room temperature.

Preferably, the step of mixing the inorganic filler particles and the elastomer (sulfonated or non-sulfonated) or its precursor (monomer and/or oligomer) preferably includes a procedure of chemically bonding the elastomer or its precursor to the inorganic filler particles. There can be several different sequences of operations.

For instance, one can disperse inorganic filler particles (with or without an electron-conducting filler or a lithium ion-conducting filler) in a monomer or oligomer (with or without a solvent; monomer itself being capable of serving as a liquid medium) to form a suspension. A chemical reaction may be optionally but preferably initiated between inorganic filler particles and the monomer/oligomer at this stage or later. Anode active material particles are then dispersed in the suspension to form a slurry. A micro-encapsulation procedure (e.g. spray-drying) is then conducted to produce droplets (particulates), wherein a particulate can contain one or several anode active material particles embraced/encapsulated by an elastomeric shell. The resulting particulate is then subjected to a polymerization/curing treatment (e.g. via heating and/or UV curing, etc.). If the starting monomer/oligomer already had sulfonate groups or were already sulfonated, the resulting reinforced elastomer shell would be a sulfonated elastomer composite. Otherwise, the resulting mass of particulates is subsequently subjected to a sulfonating treatment, if so desired.

Alternatively, one may dissolve a linear or branched chain polymer (but uncured or un-crosslinked) in a solvent to form a polymer solution. Such a polymer can be a sulfonated polymer to begin with, or can be sulfonated during any subsequent stage (e.g. after the particulates are formed). Inorganic filler particles (optionally along with an electron-conducting additive and/or a lithium ion-conducting additive) are then added into the polymer solution to form a suspension; particles of the anode active material can be added concurrently or sequentially. The suspension is then subjected to a micro-encapsulation treatment to form particulates. Curing or cross-linking of the elastomer/graphene composite is then allowed to proceed.

Thus, the step of providing the solution and suspension may include (a) sulfonating an elastomer to form a sulfonated elastomer and dissolving the sulfonated elastomer in a solvent to form a polymer solution, or (b) sulfonating the precursor (monomer or oligomer) to obtain a sulfonated precursor (sulfonated monomer or sulfonated oligomer), polymerizing the sulfonated precursor to form a sulfonated elastomer and dissolving the sulfonated elastomer in a solvent to form a solution. Inorganic filler particles (optionally along with an electron-conducting additive and/or a lithium ion-conducting additive) and anode active material particles are concurrently or sequentially added into the solution to form a suspension.

In certain embodiments, the step of dispensing the slurry and removing the solvent and/or polymerizing/curing the precursor to form the powder mass includes operating a procedure (e.g. micro-encapsulation) selected from pan-coating, air-suspension coating, centrifugal extrusion, vibration-nozzle encapsulation, spray-drying, coacervation-phase separation, interfacial polycondensation and interfacial cross-linking, in-situ polymerization, matrix polymerization, or a combination thereof.

In this method, the step of mixing the inorganic filler particles and elastomer or its precursor may include dissolving or dispersing from 0.1% to 40% by weight of a lithium ion-conducting additive in the liquid medium or solvent. The lithium ion-conducting additive may be selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0 \leq x \leq 1$, $1 \leq y \leq 4$. Alternatively or additionally, the lithium ion-conducting additive contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate, ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphates, ($LiPF_3(CF_2CF_3)_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), ionic liquid-based lithium salts, and combinations thereof.

In certain embodiments, the slurry further contains an electron-conducting polymer selected from polyaniline, polypyrrole, polythiophene, polyfuran, a bi-cyclic polymer, a sulfonated derivative thereof, or a combination thereof. Alternatively or additionally, the slurry further contains a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVdF), poly bis-methoxy ethoxyethoxide-phosphazene, polyvinyl chloride, polydimethylsiloxane, poly(vinylidene fluoride)-hexafluoropropylene (PVDF-HFP), a sulfonated derivative thereof, or a combination thereof.

The method may further comprise mixing multiple particulates of the aforementioned anode active material, a binder resin, and an optional conductive additive to form an anode electrode, which is optionally coated on an anode current collector. The method may further comprise combining the anode electrode, a cathode electrode (positive electrode), an electrolyte, and an optional porous separator into a lithium battery cell.

The presently disclosed inorganic filler-reinforced elastomer-encapsulated active material particles meet all of the criteria required of a lithium-ion battery anode material:

(a) The encapsulating material is of high strength and stiffness so that it can help to refrain the electrode active material particles, when lithiated, from expanding to an excessive extent.

(b) The protective inorganic filler-reinforced elastomer shell, having both high elasticity and high strength, has a high fracture toughness and high resistance to crack formation to avoid disintegration during repeated cycling.

(c) The inorganic filler-reinforced elastomer shell is relatively inert (inactive) with respect to the electrolyte. Further, the presence of inorganic filler particles, typically having an electrochemical potential of 1.1 V-4.5 V versus $Li/Li^+$, appears to prevent formation of solid-electrolyte interface (SEI) from forming on or in the elastomeric shell during repeated charge/discharge cycles. Since there is no direct contact between the anode active material particles and liquid electrolyte, there is no or little SEI formed on the surfaces of these particles.

(d) The inorganic filler-reinforced elastomer shell does not provide any significant amount of defect sites that irreversibly trap lithium ions. To the contrary, the inorganic filler-reinforced elastomer prevents the repeated formation and breakage of SEI on anode active material particle surfaces, which otherwise would continue to trap and consume lithium ions and electrolyte leading to continued capacity decay.

(e) Surprisingly, the inorganic filler-reinforced elastomer shell material is both lithium ion-conducting and electron-conducting.

DESCRIPTION OF THE PREFERRED EMBODIMENTS

Figure 1A:
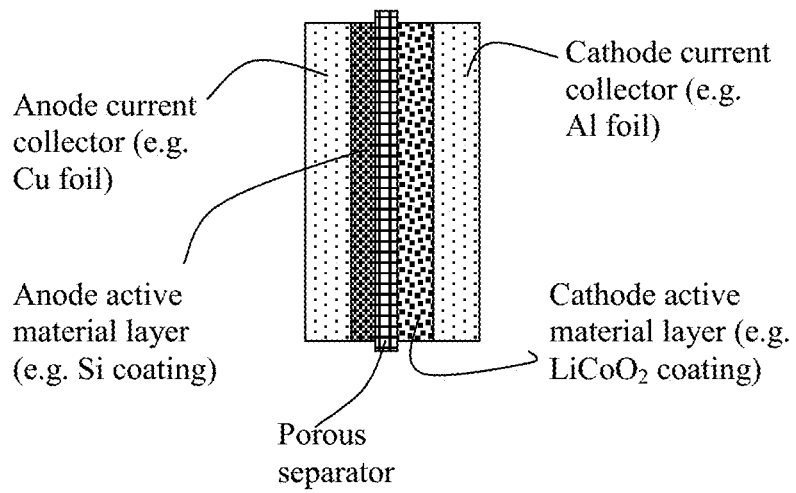
FIG. 1(A) Schematic of a prior art lithium-ion battery cell, wherein the anode layer is a thin coating of an anode active material itself.

The following includes definitions of various terms and phrases used throughout this specification.

The term "graphene sheets" means a material comprising one or more planar sheets of bonded carbon atoms that are densely packed in a hexagonal crystal lattice in which carbon atoms are bonded together through strong in-plane covalent bonds, and further containing an intact ring structure throughout a majority of the interior. Preferably at least 80% of the interior aromatic bonds are intact. In the c-axis (thickness) direction, these graphene planes may be weakly bonded together through van der Waals forces. Graphene sheets may contain non-carbon atoms at their edges or surface, for example OH and COOH functionalities. The term graphene sheets includes pristine graphene, graphene oxide, reduced graphene oxide, halogenated graphene including graphene fluoride and graphene chloride, nitrogenated graphene, hydrogenated graphene, doped graphene, functionalized graphene, and combinations thereof. Typically, non-carbon elements comprise 0 to 25 weight % of graphene sheets. Graphene oxide may comprise up to 53% oxygen by weight. Graphene sheets may comprise single-layer graphene or few-layer graphene, wherein the few-layer graphene is defined as a graphene platelet formed of less than 10 graphene planes. Graphene sheets may also comprise graphene nanoribbons. "Pristine graphene" means a graphene sheet having substantially no non-carbon elements. "Nanographene platelet" (NGP) refers to a graphene sheet having a thickness from less than 0.34 nm (single layer) to 100 nm (multi-layer).

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5% of a referenced range.

Other objects, features and advantages of the present disclosure may become apparent from the following figures, description, and examples. It should be understood, however, that the figures, description, and examples, while indicating specific embodiments of the disclosure, are given by way of illustration only and are not meant to be limiting. In further embodiments, features from specific embodiments may be combined with features from other embodiments. This disclosure is directed at the anode active material layer (negative electrode layer or anode, not including the anode current collector) containing a high-capacity anode material for a lithium secondary battery, which is preferably a secondary battery based on a non-aqueous electrolyte, a polymer gel electrolyte, an ionic liquid electrolyte, a quasi-solid electrolyte, or a solid-state electrolyte. The shape of a lithium secondary battery can be cylindrical, square, button-like, etc. The present disclosure is not limited to any battery shape or configuration. For convenience, we will primarily use Si, Sn, and $SnO_2$ as illustrative examples of a high-capacity anode active material. This should not be construed as limiting the scope of the disclosure.

Figure 1B:
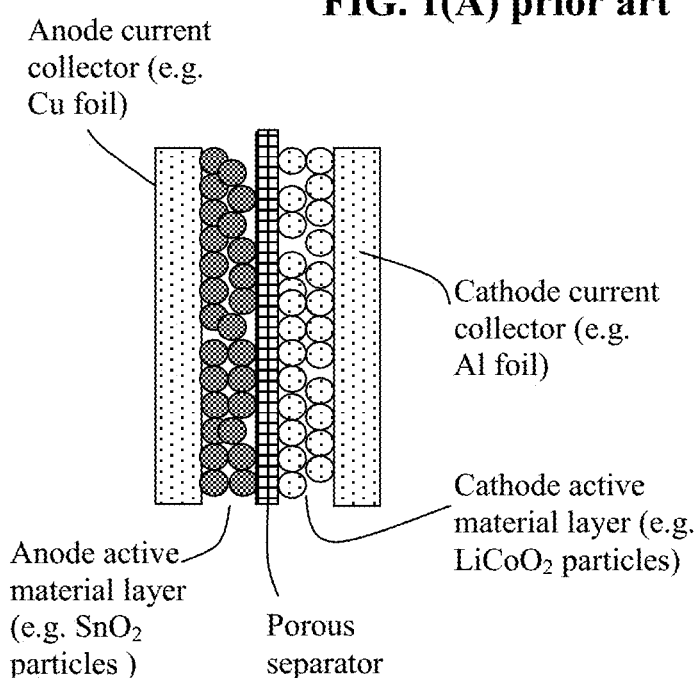
FIG. 1(B) Schematic of another prior art lithium-ion battery; the anode layer being composed of particles of an anode active material, a conductive additive (not shown) and a resin binder (not shown).

As illustrated in FIG. 1(B), a lithium-ion battery cell is typically composed of an anode current collector (e.g. Cu foil), an anode or negative electrode active material layer (i.e. anode layer typically containing particles of an anode active material, conductive additive, and binder), a porous separator and/or an electrolyte component, a cathode or positive electrode active material layer (containing a cathode active material, conductive additive, and resin binder), and a cathode current collector (e.g. Al foil). More specifically, the anode layer is composed of particles of an anode active material (e.g. graphite, Sn, $SnO_2$, or Si), a conductive additive (e.g. carbon black particles), and a resin binder (e.g. SBR or PVDF). This anode layer is typically 50-300 μm thick (more typically 100-200 μm) to give rise to a sufficient amount of current per unit electrode area.

In a less commonly used cell configuration, as illustrated in FIG. 1(A), the anode active material is deposited in a thin film form directly onto an anode current collector, such as a sheet of copper foil. This is not commonly used in the battery industry and, hence, will not be discussed further.

Figure 2A:
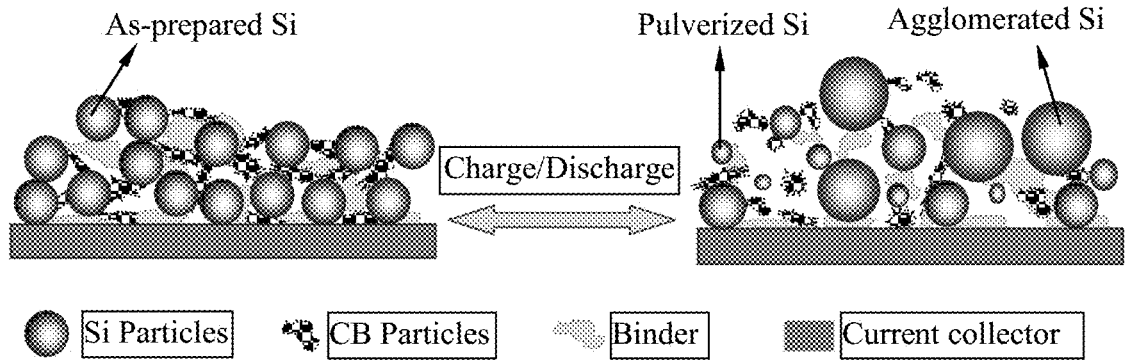
FIG. 2(A) Schematic illustrating the notion that expansion of Si particles, upon lithium intercalation during charging of a prior art lithium-ion battery, can lead to pulverization of Si particles, interruption of the conductive paths formed by the conductive additive, and loss of contact with the current collector.

In order to obtain a higher energy density cell, the anode in FIG. 1(B) can be designed to contain higher-capacity anode active materials having a composition formula of $Li_aA$ (A is a metal or semiconductor element, such as Al and Si, and "a" satisfies 0<a≤5). These materials are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, as discussed in the Background section, there are several problems associated with the implementation of these high-capacity anode active materials:

1) As schematically illustrated in FIG. 2(A), in an anode composed of these high-capacity materials, severe pulverization (fragmentation of the alloy particles) occurs during the charge and discharge cycles due to severe expansion and contraction of the anode active material particles induced by the insertion and extraction of the lithium ions in and out of these particles. The expansion and contraction, and the resulting pulverization, of active material particles, lead to loss of contacts between active material particles and conductive additives and loss of contacts between the anode active material and its current collector. These adverse effects result in a significantly shortened charge-discharge cycle life.

2) The approach of using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nanoparticles, has failed to overcome the capacity decay problem. Presumably, the protective matrix provides a cushioning effect for particle expansion or shrinkage, and prevents the electrolyte from contacting and reacting with the electrode active material. Unfortunately, when an active material particle, such as Si particle, expands (e.g. up to a volume expansion of 380%) during the battery charge step, the protective coating is easily broken due to the mechanical weakness and/o brittleness of the protective coating materials. There has been no high-strength and high-toughness material available that is itself also lithium ion conductive.

3) The approach of using a core-shell structure (e.g. Si nanoparticle encapsulated in a carbon or $SiO_2$ shell) also has not solved the capacity decay issue. As illustrated in upper portion of FIG. 2(B), a non-lithiated Si particle can be encapsulated by a carbon shell to form a core-shell structure (Si core and carbon or $SiO_2$ shell in this example). As the lithium-ion battery is charged, the anode active material (carbon- or $SiO_2$-encapsulated Si particle) is intercalated with lithium ions and, hence, the Si particle expands. Due to the brittleness of the encapsulating shell (carbon), the shell is broken into segments, exposing the underlying Si to electrolyte and subjecting the Si to undesirable reactions with electrolyte during repeated charges/discharges of the battery. These reactions continue to consume the electrolyte and reduce the cell's ability to store lithium ions.

Figure 2B:
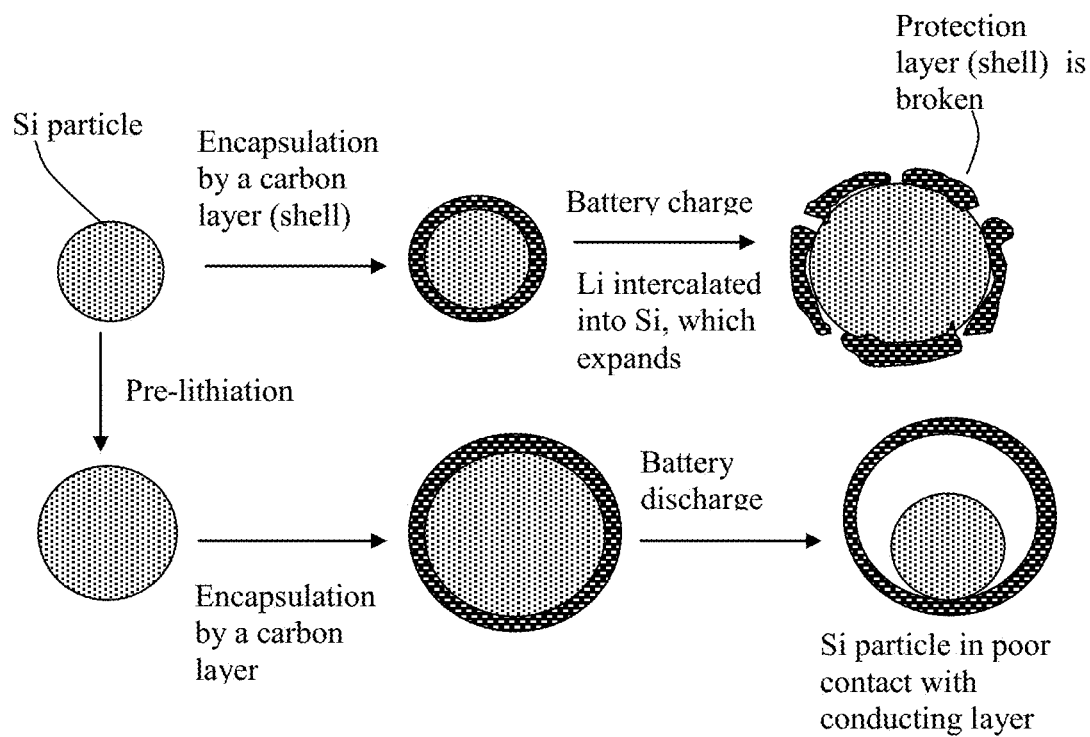
FIG. 2(B) illustrates the issues associated with prior art anode active material; for instance, a non-lithiated Si particle encapsulated by a protective shell (e.g. carbon shell) in a core-shell structure inevitably leads to breakage of the shell and that a prelithiated Si particle encapsulated with a protective layer leads to poor contact between the contracted Si particle and the rigid protective shell during battery discharge.

4) Referring to the lower portion of FIG. 2(B), wherein the Si particle has been prelithiated with lithium ions; i.e. has been pre-expanded in volume. When a layer of carbon (as an example of a protective material) is encapsulated around the prelithiated Si particle, another core-shell structure is formed. However, when the battery is discharged and lithium ions are released (de-intercalated) from the Si particle, the Si particle contracts, leaving behind a large gap between the protective shell and the Si particle. Such a configuration is not conducive to lithium intercalation of the Si particle during the subsequent battery charge cycle due to the gap and the poor contact of Si particle with the protective shell (through which lithium ions can diffuse). This would significantly curtail the lithium storage capacity of the Si particle particularly under high charge rate conditions.

In other words, there are several conflicting factors that must be considered concurrently when it comes to the design and selection of an anode active material in terms of material type, shape, size, porosity, and electrode layer thickness. Thus far, there has been no effective solution offered by any prior art teaching to these conflicting problems. We have solved these challenging issues that have troubled battery designers and electrochemists alike for more than 30 years by developing the elastomer-protected anode active material.

The present disclosure provides an anode electrode comprising multiple particulates of an anode active material (plus an optional resin binder and/or an optional conductive additive), wherein at least a particulate is composed of one or a plurality of particles of an anode active material being encapsulated by a thin layer of inorganic filler-reinforced elastomer (the encapsulating shell) that has thickness from 1 nm to 10 µm. Preferably, the inorganic filler-reinforced elastomer has a fully recoverable tensile strain from 2% to 500% (more typically from 5% to 300% and most typically from 10% to 150%), a thickness from 1 nm to 10 µm (preferably less than 100 nm and most preferably <10 nm), and a lithium ion conductivity from $10^{-7}$ S/cm to $10^{-2}$ S/cm (more typically from $10^{-5}$ S/cm to $10^{-3}$ S/cm). When an electron-conducting additive is dispersed in the elastomer matrix material, the filled elastomer has an electrical conductivity from $10^{-7}$ S/cm to 100 S/cm (more typically from $10^{-3}$ S/cm to 10 S/cm) when measured at room temperature on a separate cast thin film 20 µm thick. Preferably, the anode active material is a high-capacity anode active material having a specific lithium storage capacity greater than 372 mAh/g (which is the theoretical capacity of graphite).

In certain embodiments, the inorganic filler is selected from an oxide, carbide, boride, nitride, sulfide, phosphide, or selenide of a transition metal, a lithiated version thereof, or a combination thereof. Preferably, the transition metal is selected from Ti, V, Cr, Mn, Fe, Co, Ni, Cu, Zn, Y, Zr, Nb, Mo, Pd, Ag, Cd, La, Ta, W, Pt, Au, Hg, a combination thereof, or a combination thereof with Al, Ga, In, Sn, Pb, Sb, or Bi.

These inorganic fillers are preferably selected to have an intercalation potential (the electrochemical potential at which lithium intercalates into these materials) higher than the intercalation potential of the anode active material encapsulated in the particulate. For instance, lithium intercalates into Si at approximately 0.4-0.5 V (vs. Li/Li$^+$) and the intercalation potential of lithium titanate ($Li_4Ti_5O_{12}$) is 1.1-1.5 V. The lithium titanate may be considered as a lithiated version of titanium oxide ($TiO_2$), which has a lithium intercalation potential >2.5 V. The inorganic filler must have a lithium intercalation potential higher than 1.1 V versus Li/Li$^-$, preferably higher than 1.2 V, more preferably higher than 1.4 V, and most preferably higher than 1.5 V. These electrochemical potential conditions are found to be surprisingly capable of avoiding the formation of SEI on/in the encapsulating shell and preventing repeated formation and breakage of SEI on anode active material particles, which otherwise would result in continued and rapid decay of battery capacity.

Other examples of metal oxide are $NbO_2$ and its lithiated version and titanium-niobium composite oxide (e.g. represented by a general formula $TiNb_2O_7$) and its lithiated versions. They typically have a lithium intercalation potential higher than 1.1 V versus Li/Li$^+$.

The niobium-containing composite metal oxide for use as an inorganic filler in the encapsulating shell may be selected from the group consisting of $TiNb_2O_7$, $Li_xTiNb_2O_7$ ($0 \leq x \leq 5$), $Li_xM_{(1-y)}Nb_yNb_2O_{(7+\delta)}$ (wherein $0 \leq x \leq 6$, $0 \leq y \leq 1$, $-1 \leq \delta \leq 1$, and M=Ti or Zr), $Ti_xNb_yO_7$ ($0.5 \leq y/x < 2.0$), $TiNb_xO_{(2+5x/2)}$ ($1.9 \leq x \leq 2.0$), $M_xTi_{(1-2x)}Nb_{(2+x)}O_{(7+\delta)}$ (wherein $0 \leq x \leq 0.2$, $-0.3 \leq \delta \leq 0.3$, and M=a trivalent metal selected from Fe, Ga, Mo, Ta, V, Al, B, and a mixture thereof), $M_xTi_{(2-2x)}Nb_{(10+x)}O_{(29+\delta)}$ (wherein $0 \leq x \leq 0.4$, $-0.3 \leq \delta \leq 0.3$, and M=a trivalent metal selected from Fe, Ga, Mo, Al, B, and a mixture thereof), $M_xTiNb_2O_7$ ($x<0.5$, and M=B, Na, Mg, Al, Si, S, P, K, Ca, Mo, W, Cr, Mn, Co, Ni, and Fe), $TiNb_{2-x}Ta_xO_y$ ($0 \leq x \leq 2$, $7 \leq y \leq 10$), $Ti_2Nb_{10-v}Ta_vO_w$ ($0 \leq v < 2$, $27 \leq y \leq 29$), $Li_xTi_{(1-y)}M1_yNb_{(2-z)}M2_zO_{(7+\delta)}$ (wherein $0 \leq x \leq 5$, $0 \leq y \leq 1$, $0 \leq z \leq 2$, $-0.3 \leq \delta \leq 0.3$, M1=Zr, Si, and Sn, and M2=V, Ta, and Bi), P-doped versions thereof, B-doped versions thereof, carbon-coated versions thereof, and combinations thereof. In such a niobium-containing composite metal oxide, niobium oxide typically forms the main framework or backbone of the crystal structure, along with at least a transition metal oxide.

Transition metal oxide is but one of the suitable inorganic filler materials. The inorganic filler may be selected from an oxide, carbide, boride, nitride, sulfide, phosphide, or selenide of a transition metal, a lithiated version thereof, or a combination thereof. Preferably, these and other inorganic fillers are in a form of nanoparticle, nanowire, nanofiber, nanotube, nanosheet, nanobelt, nanoribbon, nanodisc, nanoplatelet, or nanohorn having a dimension (diameter, thickness, or width, etc.) less than 100 nm, preferably less than 10 nm. These inorganic filler materials typically have a lithium intercalation potential from 1.1 V to 3.5 V versus Li/Li$^+$, and more typically and preferably from 1.1 V to 2.5 V, and most preferably from 1.1 V to 1.5 V. The lithium intercalation potential of a filler dispersed in the elastomeric matrix material must be higher than the lithium intercalation potential of the anode active material encapsulated by the filled elastomer.

The inorganic filler material for reinforcing an elastomer matrix material may also be selected from nanodiscs, nanoplatelets, or nanosheets (having a thickness from 1 nm to 100 nm) of: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, nickel, manganese, or any transition metal; (d) boron nitride, or (e) a combination thereof. These nanodiscs, nanoplatelets, or nanosheets preferably have a thickness less than 20 nm, more preferably from 1 nm to 10 nm.

In certain preferred embodiments, the inorganic filler-reinforced elastomer further contains an electron-conducting filler dispersed in the elastomer matrix material wherein the electron-conducting filler is selected from a carbon nanotube, carbon nanofiber, nanocarbon particle, metal nanoparticle, metal nanowire, electron-conducting polymer, graphene, or a combination thereof. The graphene may be preferably selected from pristine graphene, graphene oxide, reduced graphene oxide, graphene fluoride, graphene chloride, nitrogenated graphene, hydrogenated graphene, doped graphene, functionalized graphene, or a combination thereof and the graphene preferably comprises single-layer graphene or few-layer graphene, wherein the few-layer graphene is defined as a graphene platelet formed of 2-10 graphene planes. More preferably, the graphene sheets contain 1-5 graphene planes, most preferably 1-3 graphene planes (i.e. single-layer, double-layer, or triple-layer graphene). The electron-conducting polymer is preferably selected from (but not limited to) polyaniline, polypyrrole, polythiophene, polyfuran, a bi-cyclic polymer, a sulfonated derivative thereof, or a combination thereof.

Figure 4:
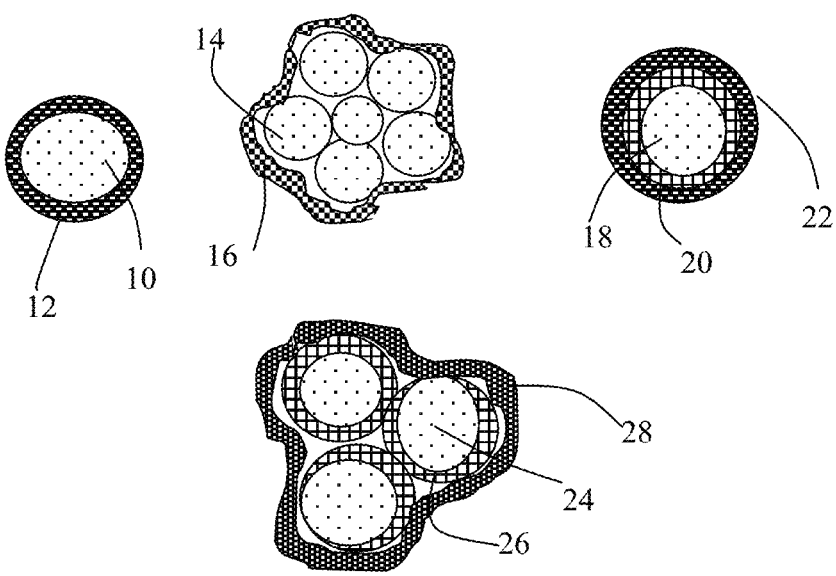
FIG. 4 Schematic of four types of sulfonated elastomer/graphene composite-embraced anode active material particles.

As illustrated in FIG. 4, the present disclosure provides four major types of particulates of inorganic filler reinforced elastomer-encapsulated anode active material particles. The first one is a single-particle particulate containing an anode active material core 10 encapsulated by an inorganic filler reinforced elastomer shell 12. The second is a multiple-particle particulate containing multiple anode active material particles 14 (e.g. Si nanoparticles), optionally along with other active materials (e.g. particles of graphite or hard carbon, not shown) or conductive additive, which are encapsulated by an inorganic filler reinforced elastomer shell 16. The third is a single-particle particulate containing an anode active material core 18 coated by a carbon layer 20 (or other conductive material) further encapsulated by an inorganic filler reinforced elastomer shell 22. The fourth is a multiple-particle particulate containing multiple anode active material particles 24 (e.g. Si nanoparticles) coated with a conductive protection layer 26, optionally along with other active materials (e.g. particles of graphite or hard carbon, not shown) or conductive additive, which are encapsulated by an inorganic filler reinforced elastomer shell 28. These anode active material particles can be prelithiated or non-prelithiated.

Figure 3:
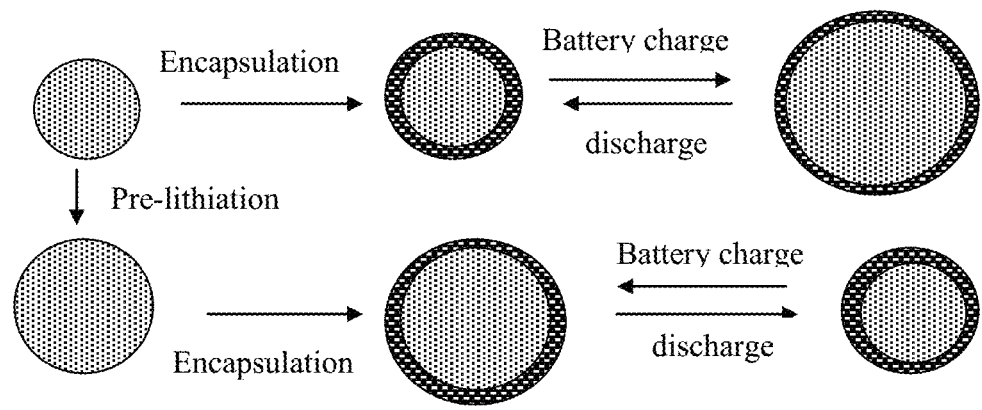
FIG. 3 Schematic of the presently disclosed sulfonated elastomer/graphene composite-encapsulated anode active material particles (prelithiated or unlithiated). The elasticity of the elastomeric shell enables the shell to expand and contract congruently and conformingly with core particle.

As schematically illustrated in the upper portion of FIG. 3, a non-lithiated Si particle can be encapsulated by an inorganic filler reinforced elastomer shell to form a core-shell structure (Si being the core and the inorganic filler reinforced elastomer being the shell in this example). As the lithium-ion battery is charged, the anode active material (encapsulated Si particle) is intercalated with lithium ions and, hence, the Si particle expands. Due to the high elasticity of the encapsulating shell, the shell will not be broken into segments (in contrast to the broken carbon shell). That the inorganic filler reinforced elastomer shell remains intact prevents the exposure of the underlying Si to electrolyte and, thus, prevents the Si from undergoing undesirable reactions with electrolyte during repeated charges/discharges of the battery. The inorganic filler reinforced elastomer shell, having a lithium intercalation potential higher than 1.1 V versus Li/Li$^+$, does not form any significant amount of SEI. This strategy prevents continued consumption of the electrolyte and Li ions to repeatedly form additional SEI on either the anode active material particles or the encapsulating shell.

Alternatively, referring to the lower portion of FIG. 3, wherein the Si particle has been prelithiated with lithium ions; i.e. has been pre-expanded in volume. When a layer of inorganic filler reinforced elastomer is made to encapsulate around the prelithiated Si particle, another core-shell structure is formed. When the battery is discharged and lithium ions are released (de-intercalated) from the Si particle, the Si particle contracts. However, the inorganic filler reinforced elastomer is capable of elastically shrinking in a conformal manner; hence, leaving behind no gap between the protective shell and the Si particle. Such a configuration is more amenable to subsequent lithium intercalation and de-intercalation of the Si particle. The elastomeric shell expands and shrinks congruently with the expansion and shrinkage of the encapsulated core anode active material particle, enabling long-term cycling stability of a lithium battery featuring a high-capacity anode active material (such as Si, Sn, SnO$_2$, Co$_3$O$_4$, etc.).

The anode active material may be selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof; (g) particles of Li, Li alloy, or surface-stabilized Li; and (h) combinations thereof. Particles of Li or Li alloy (Li-alloy containing from 0.1% to 10% by weight of Zn, Ag, Au, Mg, Ni, Ti, Fe, Co, or V element), particularly surface-stabilized Li particles (e.g. wax-coated Li particles), were found to be good anode active material per se or an extra lithium source to compensate for the loss of Li ions that are otherwise supplied only from the cathode active material. The presence of these Li or Li-alloy particles encapsulated inside an elastomeric shell was found to significantly improve the cycling performance of a lithium cell.

Prelithiation of an anode active material can be conducted by several methods (chemical intercalation, ion implementation, and electrochemical intercalation). Among these, the electrochemical intercalation is the most effective. Lithium ions can be intercalated into non-Li elements (e.g. Si, Ge, and Sn) and compounds (e.g. SnO$_2$ and Co$_3$O$_4$) up to a weight percentage of 54.68% (see Table 1 below). For Zn, Mg, Ag, and Au encapsulated inside an elastomer shell, the amount of Li can reach 99% by weight.

TABLE 1

Lithium storage capacity of selected non-Li elements.

| Intercalated compound | Atomic weight of Li, g/mole | Atomic weight of active material, g/mole | Max. wt. % of Li |
|---|---|---|---|
| Li$_4$Si | 6.941 | 28.086 | 49.71 |
| Li$_{4.4}$Si | 6.941 | 28.086 | 54.68 |
| Li$_{4.4}$Ge | 6.941 | 72.61 | 30.43 |
| Li4.4Sn | 6.941 | 118.71 | 20.85 |
| Li$_3$Cd | 6.941 | 112.411 | 14.86 |
| Li$_3$Sb | 6.941 | 121.76 | 13.93 |
| Li$_{4.4}$Pb | 6.941 | 207.2 | 13.00 |
| LiZn | 6.941 | 65.39 | 7.45 |
| Li$_3$Bi | 6.941 | 208.98 | 8.80 |

The particles of the anode active material may be in the form of a nanoparticle, nanowire, nanofiber, nanotube, nanosheet, nanoplatelet, nanodisc, nanobelt, nanoribbon, or nanohorn. They can be non-lithiated (when incorporated into the anode active material layer) or prelithiated to a desired extent (up to the maximum capacity as allowed for a specific element or compound.

Preferably and typically, the inorganic filler reinforced elastomer has a lithium ion conductivity from $10^{-7}$ S/cm to $5 \times 10^{-2}$ S/cm, more preferably and typically greater than $10^{-5}$ S/cm, further more preferably and typically greater than $10^{-4}$ S/cm, and most preferably no less than $10^{-3}$ S/cm. In some embodiments, the composite further contains from 0.1% to 40% (preferably 1% to 35%) by weight of a lithium ion-conducting additive dispersed in an elastomer matrix material.

The inorganic filler-reinforced elastomer must have a high elasticity (high elastic deformation value). By definition, an elastic deformation is a deformation that is fully recoverable upon release of the mechanical stress and the recovery process is essentially instantaneous (no significant time delay). An elastomer, such as a vulcanized natural rubber, can exhibit a tensile elastic deformation from 2% up to 1,000% (10 times of its original length). Sulfonation of the rubber reduces the elasticity to 800%. With the addition of 0.01%-50% of inorganic filler particles and/or conductive filler (e.g. CNT and graphene sheets), the tensile elastic deformation of a sulfonated elastomer/rubber is reduced to typically from 2% to 500%. It may be noted that although a metal typically has a high ductility (i.e. can be extended to a large extent without breakage), the majority of the deformation is plastic deformation (non-recoverable) and elastic deformation occurs to only a small extent (typically <1% and more typically <0.2%).

A broad array of inorganic filler reinforced elastomers can be used to encapsulate an anode active material particle or multiple particles. Encapsulation means substantially fully embracing the particle(s) without allowing the particle to be in direct contact with electrolyte in the battery. The elastomeric matrix material may be selected from a sulfonated or non-sulfonated version of natural polyisoprene (e.g. cis-1, 4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), metallocene-based poly(ethylene-co-octene) (POE) elastomer, poly(ethylene-co-butene) (ME) elastomer, styrene-ethylene-butadiene-styrene (SEBS) elastomer, epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-E1), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof.

The urethane-urea copolymer film usually consists of two types of domains, soft domains and hard ones. Entangled linear backbone chains consisting of poly(tetramethylene ether) glycol (PTMEG) units constitute the soft domains, while repeated methylene diphenyl diisocyanate (MDI) and ethylene diamine (EDA) units constitute the hard domains. The lithium ion-conducting additive can be incorporated in the soft domains or other more amorphous zones.

The electron-conducting filler may be selected from a carbon nanotube (CNT), carbon nano-fiber, graphene, nano-carbon particles, metal nanowires, etc. A graphene sheet or nanographene platelet (NGP) composed of one basal plane (graphene plane) or multiple basal planes stacked together in the thickness direction. In a graphene plane, carbon atoms occupy a 2-D hexagonal lattice in which carbon atoms are bonded together through strong in-plane covalent bonds. In the c-axis or thickness direction, these graphene planes may be weakly bonded together through van der Waals forces. An NGP can have a platelet thickness from less than 0.34 nm (single layer) to 100 nm (multi-layer). For the present electrode use, the preferred thickness is <10 nm, more preferably <3 nm (or <10 layers), and most preferably single-layer graphene. Thus, the presently disclosed sulfonated elastomer/graphene composite shell preferably contains mostly single-layer graphene, but could make use of some few-layer graphene (less than 10 layers or 10 graphene planes). The graphene sheet may contain a small amount (typically <25% by weight) of non-carbon elements, such as hydrogen, nitrogen, fluorine, and oxygen, which are attached to an edge or surface of the graphene plane.

Graphene sheets may be oxidized to various extents during their preparation, resulting in graphite oxide (GO) or graphene oxide. Hence, in the present context, graphene preferably or primarily refers to those graphene sheets containing no or low oxygen content; but, they can include GO of various oxygen contents. Further, graphene may be fluorinated to a controlled extent to obtain graphite fluoride, or can be doped using various dopants, such as boron and nitrogen.

Graphite oxide may be prepared by dispersing or immersing a laminar graphite material (e.g., powder of natural flake graphite or synthetic graphite) in an oxidizing agent, typically a mixture of an intercalant (e.g., concentrated sulfuric acid) and an oxidant (e.g., nitric acid, hydrogen peroxide, sodium perchlorate, potassium permanganate) at a desired temperature (typically 0-70° C.) for a sufficient length of time (typically 30 minutes to 5 days). In order to reduce the time required to produce a precursor solution or suspension, one may choose to oxidize the graphite to some extent for a shorter period of time (e.g., 30 minutes) to obtain graphite intercalation compound (GIC). The GIC particles are then exposed to a thermal shock, preferably in a temperature range of 600-1,100° C. for typically 15 to 60 seconds to obtain exfoliated graphite or graphite worms, which are optionally (but preferably) subjected to mechanical shearing (e.g. using a mechanical shearing machine or an ultrasonicator) to break up the graphite flakes that constitute a graphite worm. The un-broken graphite worms or individual graphite flakes are then re-dispersed in water, acid, or organic solvent and ultrasonicated to obtain a graphene polymer solution or suspension.

The pristine graphene material is preferably produced by one of the following three processes: (A) Intercalating the graphitic material with a non-oxidizing agent, followed by a thermal or chemical exfoliation treatment in a non-oxidizing environment; (B) Subjecting the graphitic material to a supercritical fluid environment for inter-graphene layer penetration and exfoliation; or (C) Dispersing the graphitic material in a powder form to an aqueous solution containing a surfactant or dispersing agent to obtain a suspension and subjecting the suspension to direct ultrasonication.

In Procedure (A), a particularly preferred step comprises (i) intercalating the graphitic material with a non-oxidizing agent, selected from an alkali metal (e.g., potassium, sodium, lithium, or cesium), alkaline earth metal, or an alloy, mixture, or eutectic of an alkali or alkaline metal; and (ii) a chemical exfoliation treatment (e.g., by immersing potassium-intercalated graphite in ethanol solution).

In Procedure (B), a preferred step comprises immersing the graphitic material to a supercritical fluid, such as carbon dioxide (e.g., at temperature T>31° C. and pressure P>7.4 MPa) and water (e.g., at T>374° C. and P>22.1 MPa), for a period of time sufficient for inter-graphene layer penetration (tentative intercalation). This step is then followed by a sudden de-pressurization to exfoliate individual graphene layers. Other suitable supercritical fluids include methane, ethane, ethylene, hydrogen peroxide, ozone, water oxidation (water containing a high concentration of dissolved oxygen), or a mixture thereof.

In Procedure (C), a preferred step comprises (a) dispersing particles of a graphitic material in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce the separated nanoscaled platelets, which are pristine, non-oxidized NGPs.

NGPs can be produced with an oxygen content no greater than 25% by weight, preferably below 20% by weight, further preferably below 5%. Typically, the oxygen content is between 5% and 20% by weight. The oxygen content can be determined using chemical elemental analysis and/or X-ray photoelectron spectroscopy (XPS).

The laminar graphite materials used in the prior art processes for the production of the GIC, graphite oxide, and subsequently made exfoliated graphite, flexible graphite sheets, and graphene platelets are, in most cases, natural graphite. However, the present disclosure is not limited to natural graphite. The starting material may be selected from the group consisting of natural graphite, artificial graphite (e.g., highly oriented pyrolytic graphite, HOPG), graphite oxide, graphite fluoride, graphite fiber, carbon fiber, carbon nanofiber, carbon nanotube, mesophase carbon microbead (MCMB) or carbonaceous microsphere (CMS), soft carbon, hard carbon, and combinations thereof. All of these materials contain graphite crystallites that are composed of layers of graphene planes stacked or bonded together via van der Waals forces. In natural graphite, multiple stacks of graphene planes, with the graphene plane orientation varying from stack to stack, are clustered together. In carbon fibers, the graphene planes are usually oriented along a preferred direction. Generally speaking, soft carbons are carbonaceous materials obtained from carbonization of liquid-state, aromatic molecules. Their aromatic ring or graphene structures are more or less parallel to one another, enabling further graphitization. Hard carbons are carbonaceous materials obtained from aromatic solid materials (e.g., polymers, such as phenolic resin and polyfurfuryl alcohol). Their graphene structures are relatively randomly oriented and, hence, further graphitization is difficult to achieve even at a temperature higher than 2,500° C. But, graphene sheets do exist in these carbons.

Graphene sheets may be oxidized to various extents during their preparation, resulting in graphite oxide or graphene oxide (GO). Hence, in the present context, graphene preferably or primarily refers to those graphene sheets containing no or low oxygen content; but, they can include GO of various oxygen contents. Further, graphene may be fluorinated to a controlled extent to obtain graphene fluoride.

Pristine graphene may be produced by direct ultrasonication (also known as liquid phase production) or supercritical fluid exfoliation of graphite particles. These processes are well-known in the art. Multiple pristine graphene sheets may be dispersed in water or other liquid medium with the assistance of a surfactant to form a suspension.

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished [F. Karlicky, et al. *"Halogenated Graphenes: Rapidly Growing Family of Graphene Derivatives"* ACS Nano, 2013, 7 (8), pp 6434-6464].

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultrasonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

In some embodiments, the inorganic filler-reinforced elastomer further contains a lithium ion-conducting additive dispersed in an elastomer matrix material. The lithium ion-conducting additive may be selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0 \leq x \leq 1$, $1 \leq y \leq 4$.

Alternatively, the lithium ion-conducting additive may contain a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate, ($LiCF_3SO_3$), bis-trifluoromethyl sulfonylimide lithium ($LiN(CF_3SO_2)_2$), lithium bis (oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphates, ($LiPF_3(CF_2CF_3)_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), ionic liquid-based lithium salts, and combinations thereof.

In some embodiments, the lithium ion-conducting additive or filler is a lithium ion-conducting polymer selected from poly(ethylene oxide) (PEO), Polypropylene oxide (PPO), poly(acrylonitrile) (PAN), poly(methyl methacrylate) (PMMA), poly(vinylidene fluoride) (PVdF), Poly bis-methoxy ethoxyethoxide-phosphazene, Polyvinyl chloride, Polydimethylsiloxane, poly(vinylidene fluoride)-hexafluoropropylene (PVDF-HFP), a derivative thereof (e.g. sulfonated versions), or a combination thereof.

The elastomeric matrix material may contain an electron-conducting polymer selected from polyaniline, polypyrrole, polythiophene, polyfuran, a bi-cyclic polymer, derivatives thereof (e.g. sulfonated versions), or a combination thereof.

Some elastomers are originally in an unsaturated chemical state (unsaturated rubbers) that can be cured by sulfur vulcanization to form a cross-linked polymer that is highly elastic (hence, an elastomer). Prior to vulcanization, these polymers or oligomers are soluble in an organic solvent to form a polymer solution. Graphene sheets can be chemically functionalized to contain functional groups (e.g. —OH, —COOH, $NH_2$, etc.) that can react with the polymer or its oligomer. The graphene-bonded oligomer or polymer may then be dispersed in a liquid medium (e.g. a solvent) to form a solution or suspension. Particles of an anode active material (e.g. $SnO_2$ nanoparticles and Si nanowires) can be dispersed in this polymer solution or suspension to form a slurry of an active material particle-polymer mixture. This suspension can then be subjected to a solvent removal treatment while individual particles remain substantially separated from one another. The graphene-bonded polymer precipitates out to deposit on surfaces of these active material particles. This can be accomplished, for instance, via spray drying.

Unsaturated rubbers that can be vulcanized to become elastomer include natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), Some elastomers are saturated rubbers that cannot be cured by sulfur vulcanization; they are made into a rubbery or elastomeric material via different means: e.g. by having a copolymer domain that holds other linear chains together. Graphene sheets can be solution- or melt-dispersed into the elastomer to form a graphene/elastomer composite. Each of these graphene/elastomer composites can be used to encapsulate particles of an anode active material by one of several means: melt mixing (followed by pelletizing and ball-milling, for instance), solution mixing (dissolving the anode active material particles in an uncured polymer, monomer, or oligomer, with or without an organic solvent) followed by drying (e.g. spray drying), interfacial polymerization, or in situ polymerization of elastomer in the presence of anode active material particles.

Saturated rubbers and related elastomers in this category include EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, and protein elastin. Polyurethane and its copolymers (e.g. urea-urethane copolymer) are particularly useful elastomeric shell materials for encapsulating anode active material particles.

Several micro-encapsulation processes require the elastomer materials to be dissolvable in a solvent. Fortunately, all the elastomers used herein are soluble in some common solvents. Even for those rubbers that are not very soluble after vulcanization, the un-cured polymer (prior to vulcanization or curing) can be readily dissolved in a common organic solvent to form a solution. This solution can then be used to encapsulate solid particles via several of the micro-encapsulation methods to be discussed in what follows. Upon encapsulation, the elastomer shell is then vulcanized or cured. Some examples of rubbers and their solvents are polybutadiene (2-methyl pentane +n-hexane or 2,3-dimethylbutane), styrene-butadiene rubber (toluene, benzene, etc.), butyl rubber (n-hexane, toluene, cyclohexane), etc. The SBR can be vulcanized with different amounts sulfur and accelerator at 433" K in order to obtain different network structures and crosslink densities. Butyl rubber (IIR) is a copolymer of isobutylene and a small amount of isoprene (e.g. about 98% polyisobutylene with 2% isoprene distributed randomly in the polymer chain). Elemental sulfur and organic accelerators (such as thiuram or thiocarbamates) can be used to cross-link butyl rubber to different extents as desired. Thermoplastic elastomers are also readily soluble in solvents.

There are three broad categories of micro-encapsulation methods that can be implemented to produce elastomer-encapsulated particles of an anode active material: physical methods, physico-chemical methods, and chemical methods. The physical methods include pan-coating, air-suspension coating, centrifugal extrusion, vibration nozzle, and spray-drying methods. The physico-chemical methods include ionotropic gelation and coacervation-phase separation methods. The chemical methods include interfacial polycondensation, interfacial cross-linking, in-situ polymerization, and matrix polymerization.

Pan-coating method: The pan coating process involves tumbling the active material particles in a pan or a similar device while the encapsulating material (e.g. elastomer monomer/oligomer, elastomer melt, elastomer/solvent solution) is applied slowly until a desired encapsulating shell thickness is attained.

Air-suspension coating method: In the air suspension coating process, the solid particles (core material) are dispersed into the supporting air stream in an encapsulating chamber. A controlled stream of a polymer-solvent solution (elastomer or its monomer or oligomer dissolved in a solvent; or its monomer or oligomer alone in a liquid state) is concurrently introduced into this chamber, allowing the solution to hit and coat the suspended particles. These suspended particles are encapsulated (fully coated) with polymers while the volatile solvent is removed, leaving a very thin layer of polymer (elastomer or its precursor, which is cured/hardened subsequently) on surfaces of these particles. This process may be repeated several times until the required parameters, such as full-coating thickness (i.e. encapsulating shell or wall thickness), are achieved. The air stream which supports the particles also helps to dry them, and the rate of drying is directly proportional to the temperature of the air stream, which can be adjusted for optimized shell thickness.

In a preferred mode, the particles in the encapsulating zone portion may be subjected to re-circulation for repeated coating. Preferably, the encapsulating chamber is arranged such that the particles pass upwards through the encapsulating zone, then are dispersed into slower moving air and sink back to the base of the encapsulating chamber, enabling repeated passes of the particles through the encapsulating zone until the desired encapsulating shell thickness is achieved.

Centrifugal extrusion: Anode active materials may be encapsulated using a rotating extrusion head containing concentric nozzles. In this process, a stream of core fluid (slurry containing particles of an anode active material dispersed in a solvent) is surrounded by a sheath of shell solution or melt. As the device rotates and the stream moves through the air it breaks, due to Rayleigh instability, into droplets of core, each coated with the shell solution. While the droplets are in flight, the molten shell may be hardened or the solvent may be evaporated from the shell solution. If needed, the capsules can be hardened after formation by catching them in a hardening bath. Since the drops are formed by the breakup of a liquid stream, the process is only suitable for liquid or slurry. A high production rate can be achieved. Up to 22.5 kg of microcapsules can be produced per nozzle per hour and extrusion heads containing 16 nozzles are readily available.

Vibrational nozzle encapsulation method: Core-shell encapsulation or matrix-encapsulation of an anode active material can be conducted using a laminar flow through a nozzle and vibration of the nozzle or the liquid. The vibration has to be done in resonance with the Rayleigh instability, leading to very uniform droplets. The liquid can consist of any liquids with limited viscosities (1-50,000 mPa·s): emulsions, suspensions or slurry containing the anode active material. The solidification can be done according to the used gelation system with an internal gelation (e.g. sol-gel processing, melt) or an external (additional binder system, e.g. in a slurry).

Spray-drying: Spray drying may be used to encapsulate particles of an active material when the active material is dissolved or suspended in a melt or polymer solution. In spray drying, the liquid feed (solution or suspension) is atomized to form droplets which, upon contacts with hot gas, allow solvent to get vaporized and thin polymer shell to fully embrace the solid particles of the active material.

Coacervation-phase separation: This process consists of three steps carried out under continuous agitation:
(a) Formation of three immiscible chemical phases: liquid manufacturing vehicle phase, core material phase and encapsulation material phase. The core material is dispersed in a solution of the encapsulating polymer (elastomer or its monomer or oligomer). The encapsulating material phase, which is an immiscible polymer in liquid state, is formed by (i) changing temperature in polymer solution, (ii) addition of salt, (iii) addition of non-solvent, or (iv) addition of an incompatible polymer in the polymer solution.
(b) Deposition of encapsulation shell material: core material being dispersed in the encapsulating polymer solution, encapsulating polymer material coated around core particles, and deposition of liquid polymer embracing around core particles by polymer adsorbed at the interface formed between core material and vehicle phase; and
(c) Hardening of encapsulating shell material: shell material being immiscible in vehicle phase and made rigid via thermal, cross-linking, or dissolution techniques.

Interfacial polycondensation and interfacial cross-linking: Interfacial polycondensation entails introducing the two reactants to meet at the interface where they react with each other. This is based on the concept of the Schotten-Baumann reaction between an acid chloride and a compound containing an active hydrogen atom (such as an amine or alcohol), polyester, polyurea, polyurethane, or urea-urethane condensation. Under proper conditions, thin flexible encapsulating shell (wall) forms rapidly at the interface. A solution of the anode active material and a diacid chloride are emulsified in water and an aqueous solution containing an amine and a polyfunctional isocyanate is added. A base may be added to neutralize the acid formed during the reaction. Condensed polymer shells form instantaneously at the interface of the emulsion droplets. Interfacial cross-linking is derived from interfacial polycondensation, wherein cross-linking occurs between growing polymer chains and a multi-functional chemical groups to form an elastomer shell material.

In-situ polymerization: In some micro-encapsulation processes, active materials particles are fully coated with a monomer or oligomer first. Then, direct polymerization of the monomer or oligomer is carried out on the surfaces of these material particles.

Matrix polymerization: This method involves dispersing and embedding a core material in a polymeric matrix during formation of the particles. This can be accomplished via spray-drying, in which the particles are formed by evaporation of the solvent from the matrix material. Another possible route is the notion that the solidification of the matrix is caused by a chemical change.

A variety of synthetic methods may be used to sulfonate an elastomer or rubber: (i) exposure to sulfur trioxide in vapor phase or in solution, possibly in presence of Lewis bases such as triethyl phosphate, tetrahydrofuran, dioxane, or amines; (ii) chlorosulfonic acid in diethyl ether; (iii) concentrated sulfuric acid or mixtures of sulfuric acid with alkyl hypochlorite; (iv) bisulfites combined to dioxygen, hydrogen peroxide, metallic catalysts, or peroxo derivates; and (v) acetyl sulfate.

Sulfonation of an elastomer or rubber may be conducted before, during, or after curing of the elastomer or rubber. Further, sulfonation of the elastomer or rubber may be conducted before or after the particles of an electrode active material are embraced or encapsulated by the elastomer/rubber or its precursor (monomer or oligomer). Sulfonation of an elastomer or rubber may be accomplished by exposing the elastomer/rubber to a sulfonation agent in a solution state or melt state, in a batch manner or in a continuous process. The sulfonating agent may be selected from sulfuric acid, sulfonic acid, sulfur trioxide, chlorosulfonic acid, a bisulfate, a sulfate (e.g. zinc sulfate, acetyl sulfate, etc.), a mixture thereof, or a mixture thereof with another chemical species (e.g. acetic anhydride, thiolacetic acid, or other types of acids, etc.). In addition to zinc sulfate, there are a wide variety of metal sulfates that may be used as a sulfonating agent; e.g. those sulfates containing Mg, Ca, Co, Li, Ba, Na, Pb, Ni, Fe, Mn, K, Hg, Cr, and other transition metals, etc.

For instance, a triblock copolymer, poly(styrene-isobutylene-styrene) or SIBS, may be sulfonated to several different levels ranging from 0.36 to 2.04 mequiv./g (13 to 82 mol % of styrene; styrene being 19 mol % of the unsulfonated block copolymer). Sulfonation of SIBS may be performed in solution with acetyl sulfate as the sulfonating agent. First, acetic anhydride reacts with sulfuric acid to form acetyl sulfate (a sulfonating agent) and acetic acid (a by-product). Then, excess water is removed since anhydrous conditions are required for sulfonation of SIBS. The SIBS is then mixed with the mixture of acetyl sulfate and acetic acid. Such a sulfonation reaction produces sulfonic acid substituted to the para-position of the aromatic ring in the styrene block of the polymer. Elastomers having an aromatic ring may be sulfonated in a similar manner.

A sulfonated elastomer also may be synthesized by copolymerization of a low level of functionalized (i.e. sulfonated) monomer with an unsaturated monomer (e.g. olefinic monomer, isoprene monomer or oligomer, butadiene monomer or oligomer, etc.).

Example 1: Sol-Gel Process for Producing $Li_xTiNb_2O_7$ (TNO)

The synthesis method involves precipitating the precursor to niobium-based composite metal oxide nanoparticles from a solution reactant mixture of $Nb(OH)_5$ (dissolved in citric acid) and water-ethanol solution containing $Ti(OC_3H_7)_4$. Specifically, $Nb_2O_5$ was dissolved in hydrofluoric acid to form a transparent solution. In order to remove the F ions from the solution, ammonia was added to obtain a white $Nb(OH)_5$ precipitate. After the precipitate was washed and dried, the $Nb(OH)_5$ was dissolved in citric acid to form a Nb(V)-citrate solution. A water-ethanol solution containing $Ti(OC_3H_7)_4$ was added to this solution while the pH value of the solution was adjusted using ammonia. This final mixture containing Nb(V) and Ti(IV) ions was then stirred at 90° C. to form a citric gel. This gel was then heated to 140° C. to obtain a precursor, which was annealed at 900° C. and at 1350° C. to obtain the $Li_xTiNb_2O_7$ (TNO) powder.

The powder was ball-milled in a high-intensity ball mill to obtain nanoparticles of TNO, which were then dispersed in monomers/oligomers of several different elastomers (e.g. polyurethane, polybutadine, etc.) to form reacting suspensions. The monomers/oligomers were then polymerized to a controlled extent without allowing for any significant cross-linking of chains. This procedure often enables chemical bonding between the composite metal oxide particles and other inorganic filler species (particles of transition metal carbide, sulfide, selenide, phosphide, nitride, boride, etc.). These non-cured or non-crosslinked polymers were then each separately dissolved in an organic solvent to form a suspension (polymer-solvent solution plus bonded metal oxide particles). Particles of anode active materials (Si, Sn, $SnO_2$, $SiO_x$, etc., respectively) were then dispersed into this suspension to form a slurry. The slurry was then spray-dried to form particulates containing anode active material particles being embraced by an encapsulating shell of metal oxide-reinforced elastomer.

Example 2: Preparation of $TiNb_2O_7$, $TiMoNbO_7$, and $TiFe_{0.3}Nb_{1.7}O_7$

A niobium-titanium composite oxide represented by the general formula $TiNb_2O_7$ was synthesized, by following the following procedure: Commercially available niobium oxide ($Nb_2O_5$) and a titanate proton compound were used as starting materials. The titanate proton compound was prepared by immersing potassium titanate in hydrochloric acid at 25° C. for 72 hours. In the process, 1M hydrochloric acid was replaced with a 1M of fresh acid every 24 hours. As a result, potassium ions were exchanged for protons to obtain the titanate proton compound.

The niobium oxide ($Nb_2O_5$) and the titanate proton compound were weighed such that the molar ratio of niobium to titanium in the synthesized compound was 3. The mixture was dispersed in 100 ml of pure water, followed by vigorous mixing. The obtained mixture was placed in a heat resistant container and was subjected to hydrothermal synthesis under conditions of 180° C. for a total of 24 hours. The obtained sample was washed in pure water three times, and then dried. The sample was then subjected to a heat treatment at 1,100° C. for 24 hours to obtain $TiNb_2O_7$.

Additionally, a niobium-molybdenum-titanium composite oxide was synthesized in the same manner as above except that niobium oxide ($Nb_2O_5$), molybdenum oxide ($Mo_2O_5$), and a titanate proton compound were weighed such that the molar ratio of niobium to titanium and that of molybdenum to titanium in the synthesized compound was 1.5 and 1.5, respectively. As a result, a niobium-molybdenum-titanium composite oxide ($TiMoNbO_7$) was obtained. In addition, a niobium-Iron-titanium composite oxide was synthesized in the same manner as above except that niobium oxide ($Nb_2O_5$), a titanate proton compound, and iron oxide ($Fe_2O_3$) were weighed such that the molar ratio of niobium to titanium and of iron to titanium in the synthesized compound was 3 and 0.3, respectively. As a result, a niobium-titanium composite oxide ($TiFe_{0.3}Nb_{1.7}O_7$) was obtained. The above niobium-containing composite metal oxide powders ($TiNb_2O_7$, $TiMoNbO_7$, and $TiFe_{0.3}Nb_{1.7}O_7$) were separately added into a monomer of synthetic polyisoprene and a mixture of monomers for urethane-urea copolymer, respectively. Polymerization of the respective reacting mass was initiated and proceeded to obtain linear chains without crosslinking. This step was found to create some bonding between the composite metal oxide particles. Subsequently, these substantially linear chains were dissolved in a solvent (e.g. benzene and DMAc) to form a solution and particles of selected anode active materials (Si, Ge, and $Co_3O_4$) were dispersed in the solution to form a slurry. The slurry was then made into particulates using the vibration nozzle method.

Example 3: Preparation of $Ga_{0.1}Ti_{0.8}Nb_{2.1}O_7$

In an experiment, 0.125 g of $GaCl_3$ and 4.025 g of $NbCl_5$ were dissolved in 10 mL of anhydrous ethanol under an inert atmosphere (argon) and magnetic stirring. The solution was transferred under air. Then, added to this solution was 6.052 g solution of titanium oxysulfate ($TiOSO_4$) at 15% by mass in sulfuric acid, followed by 10 mL of ethanol to dissolve the precursors under a magnetic stirring. The pH of the solution was adjusted to 10 by slow addition of ammonia $NH_3$ at 28% by mass into water.

The paste was transferred into a Teflon container having a 90-mL capacity, which was then placed in an autoclave. The paste was then heated up to 220° C. for 5 hours with a heating and cooling ramp of 2 and 5 degrees C./min, respectively. The paste was then washed with distilled water by centrifugation until a pH between 6 and 7 was obtained. The resulting compound was heated at 60° C. for 12 hours and then ball-milled for 30 min at 500 rpm (revolutions per minute) in hexane. After evaporation of the solvent, the powder was calcinated at 950° C. for 1 hour with a heating/cooling ramp of 3 degrees C./min to produce crystals of $Ga_{0.1}Ti_{0.8}Nb_{2.1}O_7$.

Example 4: Preparation of $Fe_{0.1}Ti_{0.8}Nb_{2.1}O_7$ Powder as a Reinforcement for Elastomer In a representative procedure, 0.116 g of $FeCl_3$ and 4.025 g of $NbCl_5$ were dissolved in 10 mL of anhydrous ethanol under an inert atmosphere (argon) and magnetic stirring. The resulting solution was transferred under air. Then, added to this solution was 6.052 g of titanium oxysulfate ($TiOSO_4$) at 15% by mass in sulfuric acid and 10 mL of ethanol to dissolve the precursors under a magnetic stirring. The pH of the solution was adjusted to 10 by slow addition of ammonia $NH_3$ at 28% by mass into water.

The paste was transferred into a Teflon container having a 90-mL capacity, which was then placed in an autoclave. The paste was then heated up to 220° C. for 5 hours with a heating and cooling ramp of 2 and 5 degrees C./min, respectively. The paste was then washed with distilled water by centrifugation until a pH between 6 and 7 was obtained. The compound was heated at 60° C. for 12 hours and then ball-milled for 30 min at 500 rpm in hexane. After evaporation of hexane, the powder was calcinated at 950° C. for 1 hour with a heating/cooling ramp of 3 degrees C./min to obtain $Fe_{0.1}Ti_{0.8}Nb_{2.1}O_7$ crystals.

Example 5: Production of Molybdenum Diselenide Nanoplatelets Using Direct Ultrasonication A sequence of steps can be utilized to form nanoplatelets from many different types of layered compounds: (a) dispersion of a layered compound in a low surface tension solvent or a mixture of water and surfactant, (b) ultrasonication, and (c) an optional mechanical shear treatment. For instance, dichalcogenides ($MoSe_2$) consisting of Se—Mo—Se layers held together by weak van der Waals forces can be exfoliated via the direct ultrasonication process disclosed by our research group. Intercalation can be achieved by dispersing $MoSe_2$ powder in a silicon oil beaker, with the resulting suspension subjected to ultrasonication at 120 W for two hours. The resulting $MoSe_2$ platelets were found to have a thickness in the range from approximately 1.4 nm to 13.5 nm with most of the platelets being mono-layers or double layers.

Other single-layer platelets of the form $MX_2$ (transition metal dichalcogenide), including $MoS_2$, $TaS_2$, $ZrS_2$, and $WS_2$, were similarly exfoliated and separated. Again, most of the platelets were mono-layers or double layers when a high sonic wave intensity was utilized for a sufficiently long ultrasonication time.

Example 6: Production of $ZrS_2$ Nanodiscs

In a representative procedure, zirconium chloride ($ZrCl_4$) precursor (1.5 mmol) and oleylamine (5.0 g, 18.7 mmol) were added to a 25-mL three-neck round-bottom flask under a protective argon atmosphere. The reaction mixture was first heated to 300° C. at a heating rate of 5° C./min under argon flow and subsequently $CS_2$ (0.3 mL, 5.0 mmol) was injected. After 1 h, the reaction was stopped and cooled down to room temperature. After addition of excess butanol and hexane mixtures (1:1 by volume), 18 nm $ZrS_2$ nanodiscs (~100 mg) were obtained by centrifugation. Larger sized nanodiscs $ZrS_2$ of 32 nm and 55 nm were obtained by changing reaction time to 3 h and 6 h, respectively otherwise under identical conditions.

Example 7: Preparation of Boron Nitride Nanosheets

Five grams of boron nitride (BN) powder, ground to approximately 20 μm or less in sizes, were dispersed in a strong polar solvent (dimethyl formamide) to obtain a suspension. An ultrasonic energy level of 85 W (Branson 5450 Ultrasonicator) was used for exfoliation, separation, and size reduction for a period of 1-3 hours. This is followed by centrifugation to isolate the BN nanosheets. The BN nanosheets obtained were from 1 nm thick (<3 atomic layers) up to 7 nm thick.

Example 8: Sulfonation of Triblock Copolymer Poly(Styrene-Isobutylene-styrene) or SIBS An example of the sulfonation procedure used in this study is summarized as follows: a 10% (w/v) solution of SIBS (50 g) and a desired amount of graphene oxide sheets (0.15 TO 405 by wt.) in methylene chloride (500 ml) was prepared. The solution was stirred and refluxed at approximately 40 8 C, while a specified amount of acetyl sulfate in methylene chloride was slowly added to begin the sulfonation reaction. Acetyl sulfate in methylene chloride was prepared prior to this reaction by cooling 150 ml of methylene chloride in an ice bath for approximately 10 min. A specified amount of acetic anhydride and sulfuric acid was then added to the chilled methylene chloride under stirring conditions. Sulfuric acid was added approximately 10 min after the addition of acetic anhydride with acetic anhydride in excess of a 1:1 mole ratio. This solution was then allowed to return to room temperature before addition to the reaction vessel.

After approximately 5 h, the reaction was terminated by slowly adding 100 ml of methanol. The reacted polymer solution was then precipitated with deionized water. The precipitate was washed several times with water and methanol, separately, and then dried in a vacuum oven at 50 8 C for 24 h. This washing and drying procedure was repeated until the pH of the wash water was neutral. After this process, the final polymer yield was approximately 98% on average. This sulfonation procedure was repeated with different amounts of acetyl sulfate to produce several sulfonated polymers with various levels of sulfonation or ion-exchange capacities (IECs). The mol % sulfonation is defined as: mol %=(moles of sulfonic acid/moles of styrene)×100%, and the IEC is defined as the mille-equivalents of sulfonic acid per gram of polymer (mequiv./g).

After sulfonation and washing of each polymer, the S-SIBS samples were dissolved in a mixed solvent of toluene/hexanol (85/15, w/w) to form solutions having polymer concentrations ranging from 5 to 2.5% (w/v). Desired amounts of transition metal oxides prepared in Examples 1-4 were added into these solutions and the resulting slurries were ultrasonicated for 0.5-1.5 hours. Particles of a desired anode active material, along with a desired amount of conducting additive (e.g. graphene sheets or CNTs) were then added into the slurry samples. The slurry samples were separately spray-dried to form sulfonated transition metal oxide-reinforced elastomer-embraced particles.

Alternatively, sulfonation may be conducted on the reinforced elastomer layer after this encapsulating layer is form. (e.g. after the anode active material particle(s) is/are encapsulated.

Example 9: Synthesis of Sulfonated Polybutadiene (PB) by Free Radical Addition of Thiolacetic Acid (TAA) Followed by in Situ Oxidation with Performic Acid A representative procedure is given as follows. PB (8.0 g) was dissolved in toluene (800 mL) under vigorous stirring for 72 h at room temperature in a 1 L round-bottom flask. Benzophenone (BZP) (0.225 g; 1.23 mmol; BZP/olefin molar ratio=1:120) and TAA (11.9 mL; 0.163 mol, TAA/olefin molar ratio=1.1) and a desired amount of inorganic filler particles (0.1%-40% by wt.) were introduced into the reactor, and the polymer solution was irradiated for 1 h at room temperature with UV light of 365 nm and power of 100 W.

The resulting inorganic material-reinforced thioacetylated polybutadiene (PB-TA) was isolated by pouring 200 mL of the toluene solution in a plenty of methanol and the polymer recovered by filtration, washed with fresh methanol, and dried in vacuum at room temperature (Yield=3.54 g). Formic acid (117 mL; 3.06 mol; HCOOH/olefin molar ratio=25), along with a desired amount of anode active material particles, from 10 to 100 grams) were added to the toluene solution of PB-TA at 50° C. followed by slow addition of 52.6 mL of hydrogen peroxide (35 wt %; 0.61 mol; $H_2O_2$/ olefin molar ratio=5) in 20 min. We would like to caution that the reaction is autocatalytic and strongly exothermic. The resulting slurry was spray-dried to obtain reinforced sulfonated polybutadiene (PB-SA-encapsulated anode active material particles (Si, SiO, Sn, $SnO_2$, $Co_3O_4$, separately).

It may be noted that inorganic filler material particles may be added at different stages of the procedure: before, during or after BZP is added or before/during/after the anode active material particles are added.

Example 10: Synthesis of Sulfonated SBS

Sulfonated styrene-butadiene-styrene triblock copolymer (SBS) based elastomer was directly synthesized. First, SBS (optionally along with graphene sheets) is first epoxidized by performic acid formed in situ, followed by ring-opening reaction with an aqueous solution of $NaHSO_3$. In a typical procedure, epoxidation of SBS was carried out via reaction of SBS in cyclohexane solution (SBS concentration=11 g/100 mL) with performic acid formed in situ from HCOOH and 30% aqueous $H_2O_2$ solution at 70° C. for 4 h, using 1 wt % poly(ethylene glycol)/SBS as a phase transfer catalyst. The molar ratio of $H_2O_2$/HCOOH was 1. The product (ESBS) was precipitated and washed several times with ethanol, followed by drying in a vacuum dryer at 60° C.

Subsequently, ESBS was first dissolved in toluene to form a solution with a concentration of 10 g/100 mL, into which was added 5 wt % TEAB/ESBS as a phase transfer catalyst and 5 wt % DMA/ESBS as a ring-opening catalyst. Herein, TEAB=tetraethyl ammonium bromide and DMA=N,N-dimethyl aniline. An aqueous solution of $NaHSO_3$ and $Na_2SO_3$ (optionally along with graphene sheets, if not added earlier) was then added with vigorous stirring at 60° C. for 7 h at a molar ratio of $NaHSO_3$/epoxy group at 1.8 and a weight ratio of $Na_2SO_3$/$NaHSO_3$ at 36%. This reaction allows for opening of the epoxide ring and attaching of the sulfonate group according to the following reaction:

Example 11: Synthesis of Sulfonated SBS by Free Radical Addition of Thiolacetic Acid (TAA) Followed by in Situ Oxidation with Performic Acid A representative procedure is given as follows. SBS (8.000 g) in toluene (800 mL) was left under vigorous stirring for 72 hours at room temperature and heated later on for 1 h at 65° C. in a 1 L round-bottom flask until the complete dissolution of the polymer. Thus, benzophenone (BZP, 0.173 g; 0.950 mmol; BZP/olefin molar ratio=1:132) and TAA (8.02 mL; 0.114 mol, TAA/olefin molar ratio=1.1) were added, and the polymer solution was irradiated for 4 h at room temperature with UV light of 365 nm and power of 100 W. To isolate a fraction of the thioacetylated sample, 20 mL of the polymer solution was treated with plenty of methanol, and the polymer was recovered by filtration, washed with fresh methanol, and dried in vacuum at room temperature. The toluene solution containing the thioacetylated polymer was equilibrated at 50° C., and 107.4 mL of formic acid (2.84 mol; HCOOH/olefin molar ratio=27.5) and 48.9 mL of hydrogen peroxide (35 wt %; 0.57 mol; $H_2O_2$/olefin molar ratio=5.5) were added in about 15 min. It may be cautioned that the reaction is autocatalytic and strongly exothermic! Particles of the desired anode active materials were added before or after this reaction. The resulting slurry was stirred for 1 h, and then most of the solvent was distilled off in vacuum at 35° C. Finally, the slurry containing the sulfonated elastomer was coagulated in a plenty of acetonitrile, isolated by filtration, washed with fresh acetonitrile, and dried in vacuum at 35° C. to obtain sulfonated elastomers.

Other elastomers (e.g. polyisoprene, EPDM, EPR, polyurethane, etc.) were sulfonated in a similar manner. Alternatively, all the rubbers or elastomers can be directly immersed in a solution of sulfuric acid, a mixture of sulfuric acid and acetyl sulfate, or other sulfonating agent discussed above to produce sulfonated elastomers/rubbers. Again, both

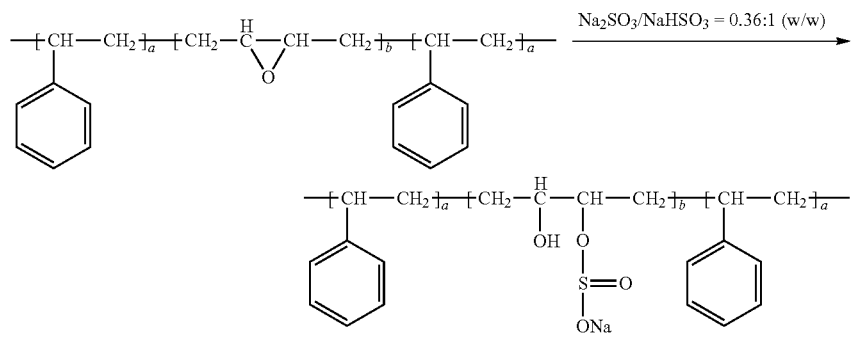

The reaction was terminated by adding a small amount of acetone solution containing antioxidant. The mixture was washed with distilled water three times, then precipitated by ethanol, followed by drying in a vacuum dryer at 50° C. It may be noted that particles of an inorganic filler and an electrode active material may be added during various stages of the aforementioned procedure (e.g. right from the beginning, or prior to the ring opening reaction). Preferably, the inorganic filler (along with the optional electron-conducting additive or lithium ion-conducting additive) is added before or during the ring opening reaction and the anode active material is added afterwards.

the inorganic filler material and anode active material particles may be added at various stages of the procedure. However, the inorganic filler material is preferably added before or immediately after addition of TAA and the anode active material particles are added at a later stage.

Example 12: Graphene Oxide from Sulfuric Acid intercalation and Exfoliation of MCMBs MCMB (mesocarbon microbeads) were supplied by China Steel Chemical Co. This material has a density of about 2.24 g/cm$^3$ with a median particle size of about 16 μm. MCMBs (10 grams) were intercalated with an acid solution (sulfuric acid, nitric acid, and potassium permanganate at a ratio of 4:1:0.05) for 48 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace pre-set at a desired temperature, 800° C.-1,100° C. for 30-90 seconds to obtain graphene samples. A small quantity of graphene was mixed with water and ultrasonicated at 60-W power for 10 minutes to obtain a suspension. A small amount was sampled out, dried, and investigated with TEM, which indicated that most of the NGPs were between 1 and 10 layers. The oxygen content of the graphene powders (GO or RGO) produced was from 0.1% to approximately 25%, depending upon the exfoliation temperature and time.

Example 13: Oxidation and Exfoliation of Natural Graphite

Graphite oxide was prepared by oxidation of graphite flakes with sulfuric acid, sodium nitrate, and potassium permanganate at a ratio of 4:1:0.05 at 30° C. for 48 hours, according to the method of Hummers [U.S. Pat. No. 2,798,878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 4. The intent was to remove all sulfuric and nitric acid residue out of graphite interstices. The slurry was dried and stored in a vacuum oven at 60° C. for 24 hours.

The dried, intercalated (oxidized) compound was exfoliated by placing the sample in a quartz tube that was inserted into a horizontal tube furnace pre-set at 1,050° C. to obtain highly exfoliated graphite. The exfoliated graphite was dispersed in water along with a 1% surfactant at 45° C. in a flat-bottomed flask and the resulting graphene oxide (GO) suspension was subjected to ultrasonication for a period of 15 minutes to obtain a homogeneous graphene-water suspension.

Example 14: Preparation of Pristine Graphene Sheets

Pristine graphene sheets were produced by using the direct ultrasonication or liquid-phase exfoliation process. In a typical procedure, five grams of graphite flakes, ground to approximately 20 μm in sizes, were dispersed in 1,000 mL of deionized water (containing 0.1% by weight of a dispersing agent, Zonyl® FSO from DuPont) to obtain a suspension. An ultrasonic energy level of 85 W (Branson 5450 Ultrasonicator) was used for exfoliation, separation, and size reduction of graphene sheets for a period of 15 minutes to 2 hours. The resulting graphene sheets were pristine graphene that had never been oxidized and were oxygen-free and relatively defect-free. There are substantially no other non-carbon elements.

Example 15: Preparation of Graphene Fluoride (GF) Sheets

Several processes have been used by us to produce GF, but only one process is herein described as an example. In a typical procedure, highly exfoliated graphite (HEG) was prepared from intercalated compound $C_2F.xClF_3$. HEG was further fluorinated by vapors of chlorine trifluoride to yield fluorinated highly exfoliated graphite (FHEG). A pre-cooled Teflon reactor was filled with 20-30 mL of liquid pre-cooled $ClF_3$, and then the reactor was closed and cooled to liquid nitrogen temperature. Subsequently, no more than 1 g of HEG was put in a container with holes for $ClF_3$ gas to access the reactor. After 7-10 days, a gray-beige product with approximate formula $C_2F$ was formed. GF sheets were then dispersed in halogenated solvents to form suspensions.

Example 16: Preparation of Nitrogenated Graphene Sheets

Graphene oxide (GO), synthesized in Example 12, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene/urea mass ratios of 1/0.5, 1/1 and 1/2 are designated as N-1, N-2 and N-3 respectively and the nitrogen contents of these samples were 14.7, 18.2 and 17.5 wt. % respectively as determined by elemental analysis. These nitrogenated graphene sheets remain dispersible in water.

Example 17: Cobalt Oxide ($Co_3O_4$) Anode Particulates

An appropriate amount of inorganic salts $Co(NO_3)_2.6H_2O$ and ammonia solution ($NH_3.H_2O$, 25 wt. %) were mixed together. The resulting suspension was stirred for several hours under an argon flow to ensure a complete reaction. The obtained $Co(OH)_2$ precursor suspension was calcined at 450° C. in air for 2 h to form particles of the layered $Co_3O_4$. Portion of the $Co_3O_4$ particles was then encapsulated with a composite metal oxide reinforced urea-urethane copolymer with the encapsulating elastomer shell thickness being varied from 25 nm to 220 nm.

For electrochemical testing, the working electrodes were prepared by mixing 85 wt. % active material (elastomer composite encapsulated or non-encapsulated particulates of $Co_3O_4$, separately), 7 wt. % acetylene black (Super-P), and 8 wt. % polyvinylidene fluoride (PVDF) binder dissolved in N-methyl-2-pyrrolidinoe (NMP) to form a slurry of 5 wt. % total solid content. After coating the slurries on Cu foil, the electrodes were dried at 120° C. in vacuum for 2 h to remove the solvent before pressing. Then, the electrodes were cut into a disk (φ=12 mm) and dried at 100° C. for 24 h in vacuum. Electrochemical measurements were carried out using CR2032 (3V) coin-type cells with lithium metal as the counter/reference electrode, Celgard 2400 membrane as separator, and 1 M $LiPF_6$ electrolyte solution dissolved in a mixture of ethylene carbonate (EC) and diethyl carbonate (DEC) (EC-DEC, 1:1 v/v). The cell assembly was performed in an argon-filled glove-box. The CV measurements were carried out using a CH-6 electrochemical workstation at a scanning rate of 1 mV/s. The electrochemical performance of the particulates of nano $Li_4Ti_5O_{12}$-reinforced sulfonated elastomer-encapsulated $Co_3O_4$ particles and that of non-protected $Co_3O_4$ were evaluated by galvanostatic charge/discharge cycling at a current density of 50 mA/g, using a LAND electrochemical workstation. The results indicate that the charge/discharge profiles for the encapsulated $Co_3O_4$ particles and un-protected $Co_3O_4$ particle-based electrodes show a long voltage plateau at about 1.06 V and 1.10 V, respectively, followed by a slopping curve down to the cut-off voltage of 0.01 V, indicative of typical characteristics of voltage trends for the $Co_3O_4$ electrode.

Figure 5:
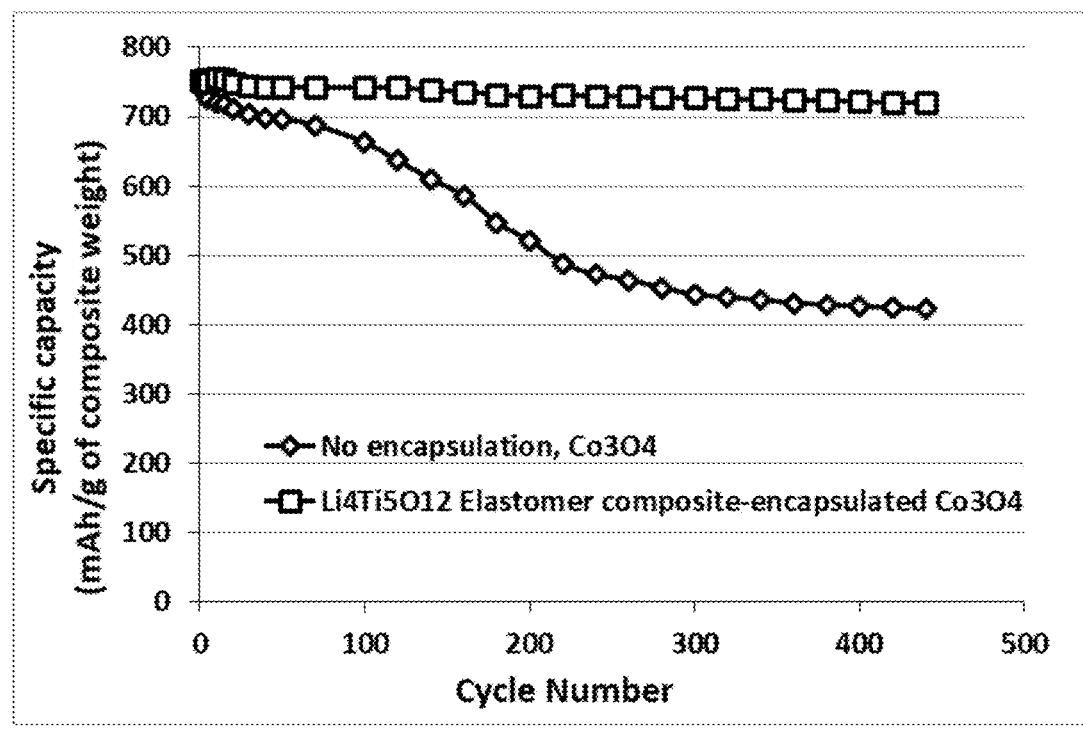
FIG. 5 The specific capacity of a lithium battery having an anode active material featuring particulates of nano $Li_4Ti_5O_{12}$-reinforced sulfonated elastomer-encapsulated $Co_3O_4$ particles and that having un-protected $Co_3O_4$ particles.

As summarized in FIG. 5, the first-cycle lithium insertion capacity is 752 mAh/g (non-encapsulated) and 751 mAh/g (encapsulated), respectively, which are higher than the theoretical values of graphite (372 mAh/g). Both cells exhibit some first-cycle irreversibility. The initial capacity loss might have resulted from the incomplete conversion reaction and partially irreversible lithium loss due to the formation of solid electrolyte interface (SEI) layers.

As the number of cycles increases, the specific capacity of the bare $Co_3O_4$ electrode drops precipitously. Compared with its initial capacity value of approximately 752 mAh/g, its capacity suffers a 20% loss after 150 cycles and a 43.9% loss after 440 cycles. By contrast, the presently disclosed elastomer-encapsulated particulates provide the battery cell with a very stable and high specific capacity for a large number of cycles, experiencing a capacity loss of less than 4% after 440 cycles. These data have clearly demonstrated the surprising and superior performance of the presently disclosed particulate electrode materials compared with prior art un-encapsulated particulate-based electrode materials.

It may be noted that the number of charge-discharge cycles at which the specific capacity decays to 80% of its initial value is commonly defined as the useful cycle life of a lithium-ion battery. Thus, the cycle life of the cell containing the non-encapsulated anode active material is approximately 150 cycles. In contrast, the cycle life of the presently disclosed cells (not just button cells, but large-scale full cells) is typically from 1,000 to 4,000.

Example 18: Inorganic Filler Reinforced Elastomer-Encapsulated Tin Oxide Particulates Tin oxide ($SnO_2$) nanoparticles were obtained by the controlled hydrolysis of $SnCl_4.5H_2O$ with NaOH using the following procedure: $SnCl_4.5H_2O$ (0.95 g, 2.7 m-mol) and NaOH (0.212 g, 5.3 m-mol) were dissolved in 50 mL of distilled water each. The NaOH solution was added dropwise under vigorous stirring to the tin chloride solution at a rate of 1 mL/min. This solution was homogenized by sonication for 5 m in. Subsequently, the resulting hydrosol was reacted with $H_2SO_4$. To this mixed solution, few drops of 0.1 M of $H_2SO_4$ were added to flocculate the product. The precipitated solid was collected by centrifugation, washed with water and ethanol, and dried in vacuum. The dried product was heat-treated at 400° C. for 2 h under Ar atmosphere. A dilute elastomer-solvent solution (0.01-0.1 M of cis-polyisoprene in cyclohexane and 1,4-dioxane) was used as a coating solution in an air-suspension method to produce elastomer-encapsulated $SnO_2$ particles having a shell thickness of 2.3 nm to 124 nm.

Figure 6:
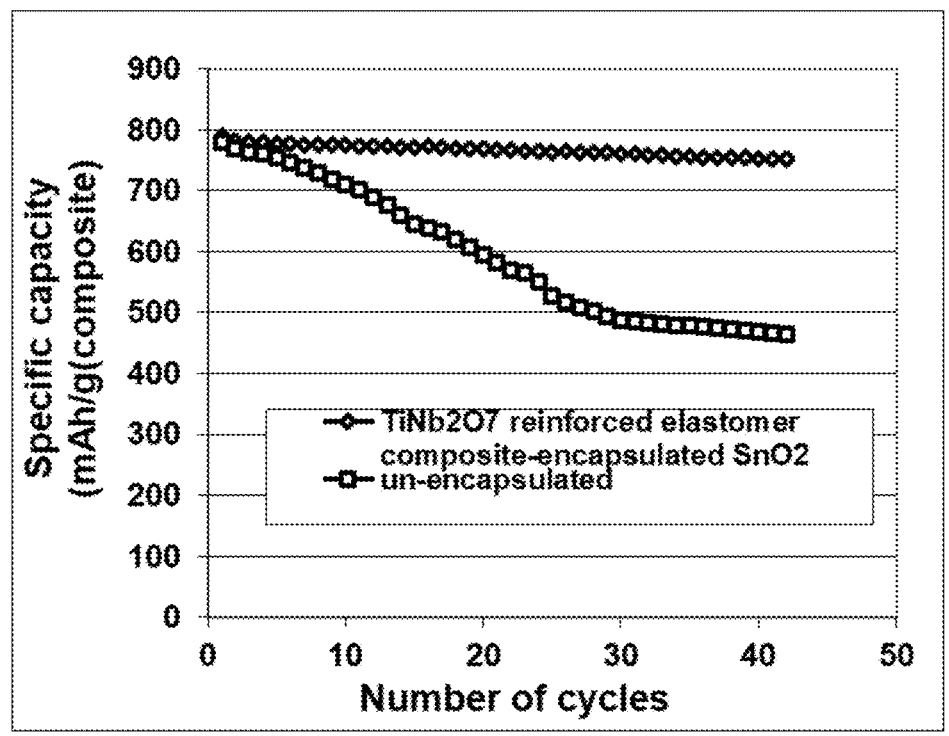
FIG. 6 The specific capacity of a lithium battery having an anode active material featuring $TiNb_2O_7$ reinforced elastomer-encapsulated $SnO_2$ particles and that having un-protected $SnO_2$ particles.

The battery cells from the $TiNb_2O_7$ reinforced elastomer-encapsulated $SnO_2$ particles and non-coated $SnO_2$ particles were prepared using a procedure described in Example 1. FIG. 6 shows that the anode prepared according to the presently disclosed inorganic filler reinforced elastomer-encapsulated particulate approach offers a significantly more stable and higher reversible capacity compared to the un-coated $SnO_2$ particle-based.

Example 19: Tin (Sn) Nanparticles Encapsulated by a Reinforced Sulfonated Styrene-Butadiene Rubber (SBR)/Graphene Composite Nanparticles (76 nm in diameter) of Sn were encapsulated with a thin layer of SBR shell via the spray-drying method, followed by curing of the butadiene segment of the SBR chains to impart high elasticity to the SBR. For comparison, some amount of Sn nanoparticles was encapsulated by a carbon shell. Carbon encapsulation is well-known in the art. Un-protected Sn nanoparticles from the same batch were also investigated to determine and compare the cycling behaviors of the lithium-ion batteries containing these particles as the anode active material.

Figure 7:
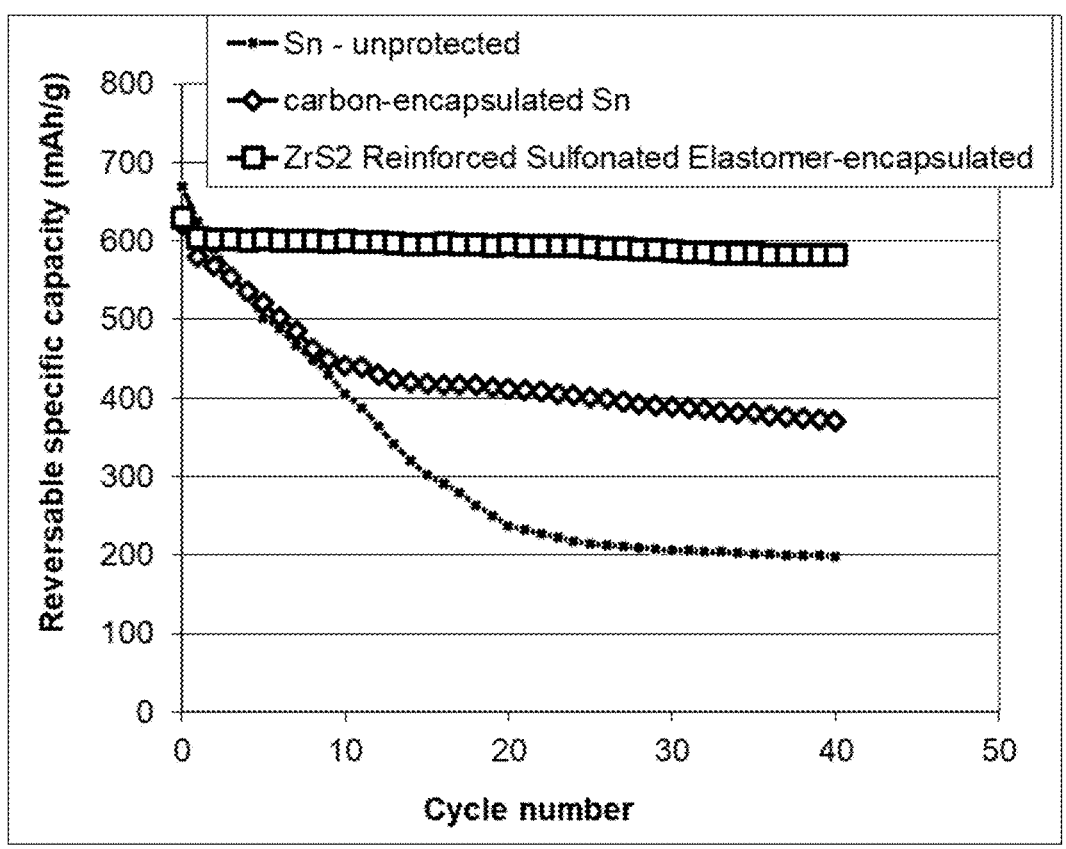
FIG. 7 The specific capacity of a lithium battery having an anode active material featuring $ZrS_2$ nanosheet-reinforced elastomer-encapsulated Sn particles, that having carbon-encapsulated Sn particles, and that having un-protected Sn particles.

Shown in FIG. 7 are the discharge capacity curves of three coin cells having three different Sn particles as the anode active material: $ZrS_2$ nanosheet-reinforced elastomer-encapsulated Sn particles, carbon-encapsulated Sn particles, and un-protected Sn particles. These results have clearly demonstrated that the inorganic filler reinforced elastomer encapsulation strategy provides the very best protection against capacity decay of a lithium-ion battery featuring a high-capacity anode active material. Carbon encapsulation is not good enough to provide the necessary protection.

Example 20: Si Nanowire-Based Particulates

Figure 8:
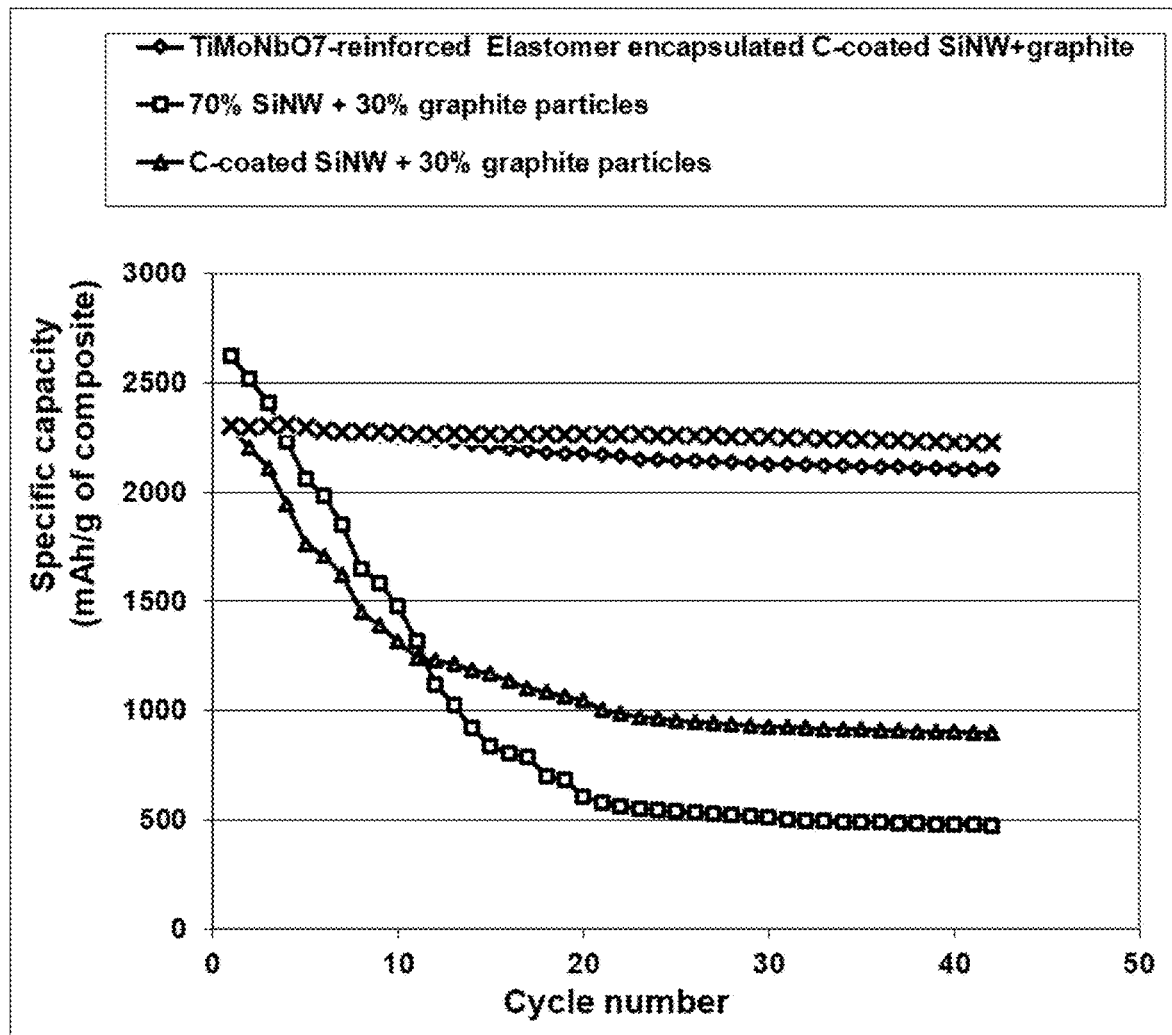
FIG. 8 Specific capacities of 4 lithium-ion cells having Si nanowires (SiNW) as an anode active material: unprotected SiNW, carbon-coated SiNW, $TiMoNbO_7$-reinforced elastomer-encapsulated SiNW, and $TiMoNbO_7$-reinforced elastomer-encapsulated carbon-coated SiNW.

Si nanowires were supplied from Angstron Energy Co. (Dayton, Ohio). Some Si nanowires were encapsulated with graphene-reinforced cis-polyisoprene elastomer. Some Si nanowires were coated with a layer of amorphous carbon and then encapsulated with graphene-reinforced cis-polyisoprene elastomer. For comparison purposes, Si nanowires unprotected and protected by carbon coating (but no elastomer encapsulation), respectively, were also prepared and implemented in a separate lithium-ion cell. In all four cells, approximately 25-30% of graphite particles were mixed with the protected or unprotected Si nanowires (SiNW), along with 5% binder resin, to make an anode electrode. The cycling behaviors of these 4 cells are shown in FIG. 8, which indicates that $TiMoNbO_7$-reinforced elastomer encapsulation of Si nanowires, with or without carbon coating, provides the most stable cycling response. Carbon coating alone does not help to improve cycling stability by much.

Figure 9:
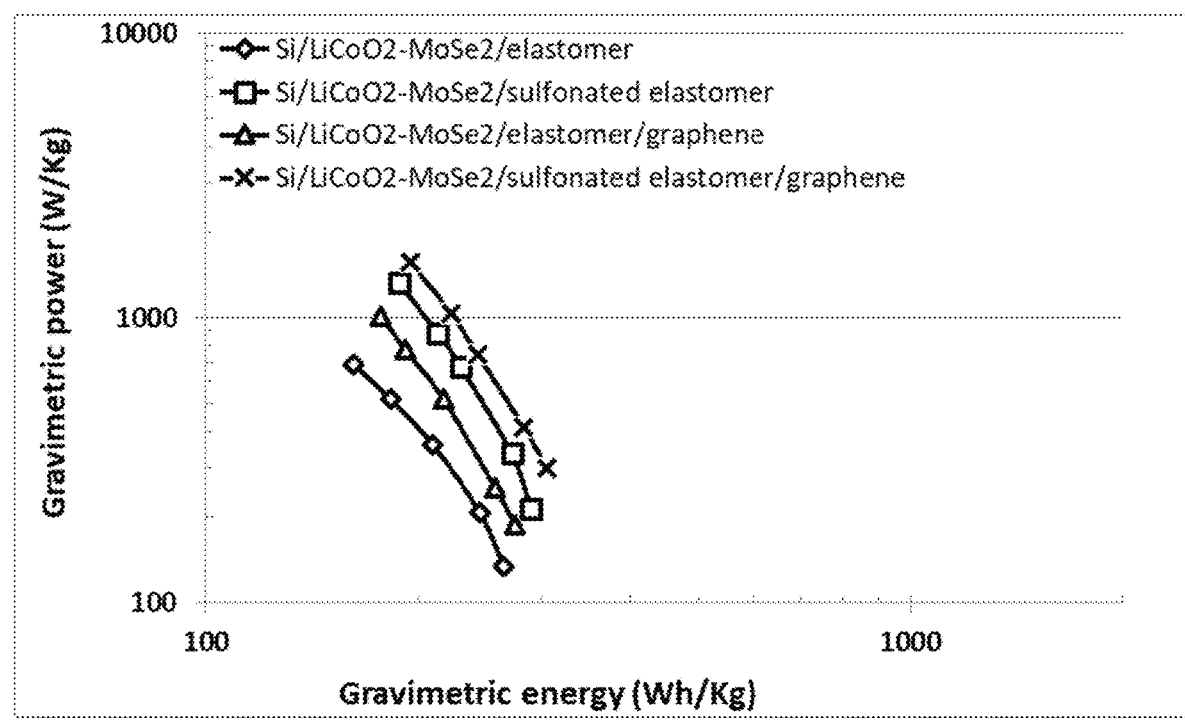
FIG. 9 Ragone plot of 4 lithium-ion cells having Si nanowires (SiNW) as an anode active material: $MoSe_2$ nanosheet reinforced elastomer-encapsulated SiNW, $MoSe_2$ nanosheet reinforced sulfonated elastomer-encapsulated SiNW, $MoSe_2$ nanosheet/graphene reinforced elastomer-encapsulated SiNW, and $MoSe_2$ nanosheet/graphene reinforced sulfonated elastomer-encapsulated SiNW.

FIG. 9 shows the Ragone plots (power density vs. energy density curves) of 4 lithium-ion cells having Si nanowires (SiNW) as an anode active material: $MoSe_2$ nanosheet reinforced elastomer-encapsulated SiNW, $MoSe_2$ nanosheet reinforced sulfonated elastomer-encapsulated SiNW, $MoSe_2$ nanosheet reinforced elastomer/graphene composite-encapsulated SiNW, and $MoSe_2$ nanosheet reinforced sulfonated elastomer/graphene composite-encapsulated SiNW. These and similar data for other types of anode materials demonstrate that the approaches of sulfonation and/or inorganic filler addition enable a higher energy density and/or higher power density to lithium cells featuring a high-capacity anode active material. Inorganic fillers having a judiciously selected lithium intercalation potential appear to impart electrochemical stability and sulfonation appears to impart lithium ion conductivity (hence, rate capability) to the protecting elastomer shell encapsulating anode active material particles.

Example 21: Effect of Lithium Ion-Conducting Additive in an Elastomer Shell

A wide variety of lithium ion-conducting additives were added to several different sulfonated elastomer composites to prepare encapsulation shell materials for protecting core particles of an anode active material. We have discovered that these filled elastomer materials are suitable encapsulation shell materials provided that their lithium ion conductivity at room temperature is no less than $10^{-7}$ S/cm. With these materials, lithium ions appear to be capable of readily diffusing in and out of the encapsulation shell having a thickness no greater than 1 μm. For thicker shells (e.g. 10 μm), a lithium ion conductivity at room temperature no less than $10^{-4}$ S/cm would be required.

TABLE 2

Lithium ion conductivity of various sulfonated elastomer composite compositions as a shell material for protecting anode active material particles.

| Sample No. | Lithium-conducting additive | $Li_4Ti_5O_{12}$-elastomer (1-2 μm thick); 5-10% $Li_4Ti_5O_{12}$ unless otherwise noted | Li-ion conductivity (S/cm) |
|---|---|---|---|
| E-1s | $Li_2CO_3$ + $(CH_2OCO_2Li)_2$ | 70-99% polyurethane, 2% RGO | $5.2 \times 10^{-6}$ to $4.8 \times 10^{-3}$ S/cm |
| E-2s | $Li_2CO_3$ + $(CH_2OCO_2Li)_2$ | 65-99% polyisoprene, 8% pristine graphene | $1.8 \times 10^{-5}$ to $7.5 \times 10^{-4}$ S/cm |
| E-3s | $Li_2CO_3$ + $(CH_2OCO_2Li)_2$ | 65-80% SBR, 15% RGO | $8.9 \times 10^{-6}$ to $8.7 \times 10^{-4}$ S/cm |
| D-4s | $Li_2CO_3$ + $(CH_2OCO_2Li)_2$ | 70-99% urethane-urea, 12% nitrogenated graphene | $1.6 \times 10^{-6}$ to $6.6 \times 10^{-4}$ S/cm |
| D-5s | $Li_2CO_3$ + $(CH_2OCO_2Li)_2$ | 75-99% polybutadiene | $2.2 \times 10^{-5}$ to $7.9 \times 10^{-3}$ S/cm |
| B1s | LiF + LiOH + $Li_2C_2O_4$ | 80-99% chloroprene rubber | $1.7 \times 10^{-6}$ to $6.8 \times 10^{-4}$ S/cm |
| B2s | LiF + HCOLi | 80-99% EPDM | $5.6 \times 10^{-6}$ to $4.4 \times 10^{-3}$ S/cm |
| B3s | LiOH | 70-99% polyurethane | $3.9 \times 10^{-5}$ to $4.5 \times 10^{-3}$ S/cm |
| B4s | $Li_2CO_3$ | 70-99% polyurethane | $5.4 \times 10^{-5}$ to $5.3 \times 10^{-3}$ S/cm |
| B5s | $Li_2C_2O_4$ | 70-99% polyurethane | $2.4 \times 10^{-5}$ to $3.2 \times 10^{-3}$ S/cm |
| B6s | $Li_2CO_3$ + LiOH | 70-99% polyurethane | $2.6 \times 10^{-5}$ to $4.1 \times 10^{-3}$ S/cm |
| C1s | $LiClO_4$ | 70-99% urethane-urea | $5.7 \times 10^{-5}$ to $4.8 \times 10^{-3}$ S/cm |
| C2s | $LiPF_6$ | 70-99% urethane-urea | $4.7 \times 10^{-5}$ to $1.7 \times 10^{-3}$ S/cm |
| C3s | $LiBF_4$ | 70-99% urethane-urea | $3.2 \times 10^{-5}$ to $4.4 \times 10^{-4}$ S/cm |
| C4s | LiBOB + $LiNO_3$ | 70-99% urethane-urea | $8.7 \times 10^{-6}$ to $3.5 \times 10^{-4}$ S/cm |
| S1s | Sulfonated polyaniline | 85-99% SBR | $8.2 \times 10^{-6}$ to $9.3 \times 10^{-4}$ S/cm |
| S2s | Sulfonated SBR | 85-99% SBR | $7.8 \times 10^{-6}$ to $5.8 \times 10^{-4}$ S/cm |
| S3s | Sulfonated PVDF | 80-99% chlorosulfonated polyethylene (CS-PE) | $5.4 \times 10^{-6}$ to $5.7 \times 10^{-4}$ S/cm |
| S4s | Polyethylene oxide | 80-99% CS-PE | $6.6 \times 10^{-6}$ to $4.7 \times 10^{-4}$ S/cm |

Example 22: Cycle Stability of Various Rechargeable Lithium Battery Cells

In lithium-ion battery industry, it is a common practice to define the cycle life of a battery as the number of charge-discharge cycles that the battery suffers 20% decay in capacity based on the initial capacity measured after the required electrochemical formation. Summarized in Table 3 below are the cycle life data of a broad array of batteries featuring presently disclosed elastomer-encapsulated anode active material particles vs. other types of anode active materials.

TABLE 3

Cycle life data of various lithium secondary (rechargeable) batteries.

| Sample ID | Protective means; 1-25% graphene; sulfonated elastomer | Type & % of anode active material | Initial capacity (mAh/g) | Cycle life (No. of cycles) |
|---|---|---|---|---|
| Si-1i | SBR-encapsulation, 2% Gn | 25% by wt. Si nanparticles (80 nm) + 67% graphite + 8% binder | 1,120 | 1,644-1,855 |
| Si-2i | Carbon encapsulation | 25% by wt. Si nanparticles (80 nm) | 1,242 | 251 |
| SiNW-1i | Urea-Urethane encapsulation, 5% Gn | 35% Si nanowires (diameter = 90 nm) | 1,258 | 1,720 |
| SiNW-2i | ethylene oxide-epichlorohydrin copolymer, 8% Gn | 45% Si nanparticles, prelithiated or non-prelithiated (no pre-Li) | 1,766 | 1,880 (prelithiated); 1,355 (no prelithiation) |
| $VO_2$-1i | Polyurethane encapsulation, 3% Gn | 90%-95%, $VO_2$ nanoribbon | 255 | 1886 |
| $Co_3O_4$-2i | Polyisoprene encapsulation, 10% Gn | 85% $Co_3O_4$ + 8% graphite platelets + binder | 720 | 2,650 (Prelithiated); 1,980 (no pre-Li) |
| $Co_3O_4$-2i | No encapsulation | 85% $Co_3O_4$ + 8% graphite platelets + binder | 725 | 266 |
| $SnO_2$-2i | polybutadiene encapsulation, 2% Gn | 75% $SnO_2$ particles (3 μm initial size) | 740 | 1,675 |
| $SnO_2$-2i | EPDM encapsulation, 7% Gn | 75% $SnO_2$ particles (87 nm in diameter) | 738 | 3,565 (Pre-Li); 2,250 (non pre-Li) |

TABLE 3-continued

Cycle life data of various lithium secondary (rechargeable) batteries.

| Sample ID | Protective means; 1-25% graphene; sulfonated elastomer | Type & % of anode active material | Initial capacity (mAh/g) | Cycle life (No. of cycles) |
|---|---|---|---|---|
| Ge-1i | butyl rubber encapsulation of C-coated Ge, 2% Gn | 85% Ge + 8% graphite platelets + binder | 850 | 1,666 |
| Ge-2i | Carbon-coated | 85% Ge + 8% graphite platelets + binder | 856 | 120 |
| Al-Li-1i | Polyurethane encapsulation, 25% Gn | Al/Li alloy (3/97) particles | 2,850 | 2,118 |
| Al-Li-2i | None | Al/Li alloy particles | 2,856 | 155 |
| Zn-Li-1i | Cis-polyisoprene encapsulation, 1% Gn | C-coated Zn/Li alloy (5/95) particles | 2,626 | 1,755 |
| Zn-Li-2i | None | C-coated Zn/Li alloy (5/95) particles | 2,631 | 146 |

These data further confirm the following:
(1) The inorganic filler reinforced elastomer encapsulation strategy is surprisingly effective in alleviating the anode expansion/shrinkage-induced capacity decay problems.
(2) The encapsulation of high-capacity anode active material particles by carbon or other non-elastomeric protective materials does not provide much benefit in terms of improving cycling stability of a lithium-ion battery
(3) Prelithiation of the anode active material particles prior to elastomer encapsulation is beneficial.
(4) Sulfonation further improves the lithium ion conductivity of an elastomer and, hence, power density of the resulting battery.
(5) SEM examination of the anodes in various battery cells opened after hundreds of charge/discharge cycles reveal no significant amount of SEI formed on surfaces of anode active material particles or the inorganic filler reinforced elastomer shell containing an inorganic filler having a lithium intercalation potential higher than 1.1 V versus $Li/Li^+$. This filled elastomer encapsulation strategy prevents continued consumption of the electrolyte and Li ions to repeatedly form additional SEI on surfaces of either the anode active material particles or the encapsulating shell.

We claim:

1. A method of producing a powder mass for a lithium battery, the method comprising: (a) mixing an inorganic filler material and an elastomer or its precursor in a liquid medium or solvent to form a suspension; (b) dispersing a plurality of particles of an anode active material in the suspension to form a slurry; and (c) dispensing the slurry and removing the solvent and/or polymerizing or curing the precursor to form the powder mass, wherein the powder mass comprises multiple particulates and at least one said particulate is composed of one or a plurality of particles of said anode active material being encapsulated by a thin layer of inorganic filler-reinforced elastomer having from 0.01% to 50% by weight of an inorganic filler dispersed in an elastomeric matrix material, wherein said thin layer of inorganic filler-reinforced elastomer has a thickness from 1 nm to 10 µm, a fully recoverable tensile strain from 2% to 500%, and a lithium ion conductivity from $10^{-7}$ S/cm to $5 \times 10^{-2}$ S/cm and said inorganic filler has a lithium intercalation potential from 1.1 V to 4.5 V versus $Li/Li^+$, wherein said fully recoverable tensile strain is a strain that is fully recoverable upon release of stress and recovery process thereof is essentially instantaneous.

2. The method of claim 1, wherein said inorganic filler is selected from oxides, carbides, borides, nitrides, sulfides, phosphides, or selenides of transition metals, lithiated versions thereof, and combinations thereof.

3. The method of claim 2, wherein said transition metal is selected from Ti, V, Cr, Mn, Fe, Co, Ni, Cu, Zn, Y, Zr, Nb, Mo, Pd, Ag, Cd, La, Ta, W, Pt, Au, Hg, combinations thereof, and combinations thereof with Al, Ga, In, Sn, Pb, Sb, or Bi.

4. The method of claim 1, wherein said inorganic filler is selected from nanodiscs, nanoplatelets, or nanosheets of (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, nickel, manganese, or any transition metal; (d) boron nitride, and (e) combinations thereof, wherein said nanodiscs, nanoplatelets, or nanosheets have a thickness from 1 nm to 100 nm.

5. The method of claim 1, wherein said elastomeric matrix material contains a material selected from a sulfonated or un-sulfonated version of natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poly(ethylene-co-octene) elastomer, polyethylene-co-butene) elastomer, styrene-ethylene-butadiene-styrene elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, and combinations thereof.

6. The method of claim 1, wherein said inorganic filler-reinforced elastomer further contains an electron-conducting filler dispersed in said elastomer matrix material wherein said electron-conducting filler is selected from a carbon nanotube, carbon nanofiber, carbon nanoparticle, metal nanoparticle, metal nanowire, electron-conducting polymer, graphene, or a combination thereof, wherein said graphene is selected from pristine graphene, graphene oxide, reduced graphene oxide, graphene fluoride, graphene chloride, nitrogenated graphene, hydrogenated graphene, doped graphene, functionalized graphene, and combinations thereof and said graphene comprise single-layer graphene or few-layer graphene, wherein said few-layer graphene is defined as a graphene platelet formed of less than 10 graphene planes.

7. The method of claim 6, wherein said electron-conducting polymer is selected from polyaniline, polypyrrole, polythiophene, polyfuran, a bi-cyclic polymer, a sulfonated derivative thereof, and combinations thereof.

8. The method of claim 6, wherein said graphene consists essentially of graphene sheets which have a length or width from 5 nm to 5 μm.

9. The method of claim 1, wherein said anode active material is selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof; (g) particles of Li, Li alloy, or surface-stabilized Li having at least 60% by weight of lithium element therein; and (h) combinations thereof.

10. The method of claim 9, wherein said Li alloy contains from 0.1% to 10% by weight of a metal element selected from Zn, Ag, Au, Mg, Ni, Ti, Fe, Co, V, and combinations thereof.

11. The method of claim 1, wherein said anode active material contains a prelithiated Si, prelithiated Ge, prelithiated Sn, prelithiated $SnO_x$, prelithiated $SiO_x$, prelithiated iron oxide, prelithiated $VO_2$, prelithiated $Co_3O_4$, prelithiated $Ni_3O_4$, lithium titanate, and combinations thereof, wherein $0 \leq x \leq 1$, $1 \leq y \leq 4$.

12. The method of claim 1, wherein said step of mixing the inorganic filler material and the elastomer or its precursor includes a procedure of chemically bonding the elastomer or its precursor to particles of said inorganic filler material.

13. The method of claim 1, wherein said step of forming the suspension includes forming a polymer solution which includes (a) sulfonating an elastomer to form a sulfonated elastomer and dissolving the sulfonated elastomer in a solvent to form a polymer solution, or (b) sulfonating the precursor to obtain a sulfonated precursor, polymerizing the sulfonated precursor to form a sulfonated elastomer and dissolving the sulfonated elastomer in a solvent to form said polymer solution.

14. The method of claim 1, wherein step (b) includes concurrently or sequentially adding said inorganic filler material and said anode active material particles into said suspension to form said slurry.

15. The method of claim 1, wherein step (c) includes operating a micro-encapsulation procedure selected from pan-coating, air-suspension coating, centrifugal extrusion, vibration-nozzle encapsulation, spray-drying, coacervation-phase separation, interfacial polycondensation and interfacial cross-linking, in-situ polymerization, matrix polymerization, or a combination thereof.

16. The method of claim 1, wherein said anode active material is in a form of nanoparticle, nanowire, nanofiber, nanotube, nanosheet, nanoplatelet, nanodisc, nanobelt, nanoribbon, or nanohorn having a thickness or diameter from 0.5 nm to 100 nm.

17. The method of claim 1, further including coating said one or a plurality of particles with a layer of carbon disposed between said one or plurality of particles and said inorganic filler-reinforced elastomer layer.

18. The method of claim 1, further includes dispersing particles of a graphite or carbon material in said slurry in such a manner that said particulate further contains particles of said graphite or carbon material encapsulated therein.

19. The method of claim 18, wherein said graphite or carbon material is selected from polymeric carbon, amorphous carbon, chemical vapor deposition carbon, coal tar pitch, petroleum pitch, mesophase pitch, carbon black, coke, acetylene black, activated carbon, fine expanded graphite particle with a dimension smaller than 100 nm, artificial graphite particle, natural graphite particle, or a combination thereof.

20. The method of claim 16, wherein said nanoparticle, nanowire, nanofiber, nanotube, nanosheet, nanoplatelet, nanodisc, nanobelt, nanoribbon, or nanohorn is coated with or embraced by a conductive protective coating selected from a carbon material, an electronically conductive polymer, a conductive metal oxide, or a conductive metal coating.

21. The method of claim 16, wherein said nanoparticle, nanowire, nanofiber, nanotube, nanosheet, nanoplatelet, nanodisc, nanobelt, nanoribbon, or nanohorn is pre-intercalated or pre-doped with lithium ions to form a prelithiated anode active material having an amount of lithium from 0.1% to 54.7% by weight of said prelithiated anode active material.

22. The method of claim 1, further comprising a step of dissolving or dispersing 0.1% to 40% by weight of a lithium ion-conducting additive in said slurry in such a manner that said inorganic filler material-reinforced elastomer further contains said lithium ion-conducting additive dispersed in said elastomeric matrix material.

23. The method of claim 22, wherein said lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, and combinations thereof, wherein X=F, Cl, I, or Br, R=a hydrocarbon group, $0 \leq x \leq 1$, and $1 \leq y \leq 4$.

24. The method of claim 22, wherein said lithium ion-conducting additive contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate, ($LiCF_3SO_3$), bis-trifluoromethyl sulfonylimide lithium (LiN($CF_3SO_2$)$_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphates, ($LiPF_3(CF_2CF_3)_3$), lithium bisperfluoroethysulfonylimide (LiBETI), lithium bis(trifluoromethanesulphonyl)imide, lithium bis(fluorosulphonyl)imide, lithium trifluoromethanesulfonimide (LiTFSI), ionic liquid-based lithium salts, and combinations thereof.

25. The method of claim 1, further comprising a step of dissolving or dispersing an electron-conducting polymer in said slurry wherein said electron-conducting polymer is selected from polyaniline, polypyrrole, polythiophene, polyfuran, a bi-cyclic polymer, a sulfonated derivative thereof, and combinations thereof.

26. The method of claim 1, further comprising a step of dissolving or dispersing a lithium ion-conducting polymer in said slurry wherein said lithium ion-conducting polymer is selected from poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazene, polyvinyl chloride, polydimethylsiloxane, poly(vinylidene fluoride)-hexafluoropropylene (PVDF-HFP), a sulfonated derivative thereof, and combinations thereof.

27. The method of claim 1, further comprising a step of mixing multiple particulates of said anode active material, a binder resin, and an optional conductive additive to form an anode active material layer, which is optionally coated on an anode current collector.

28. The method of claim 27, further comprising combining said anode active material layer, a cathode layer, an electrolyte, and an optional porous separator into a lithium battery cell.

29. The method of claim 28, wherein said lithium battery cell is a lithium-ion battery, lithium metal battery, lithium-sulfur battery, lithium-selenium battery, or lithium-air battery.

* * * * *